(12) United States Patent
Majima et al.

(10) Patent No.: US 6,681,741 B2
(45) Date of Patent: Jan. 27, 2004

(54) CONTROL APPARATUS FOR INTERNAL COMBUSTION ENGINE

(75) Inventors: Yoshihiro Majima, Inuyama (JP); Toyoji Yagi, Anjo (JP)

(73) Assignee: Denso Corporation, Kariya (JP)

( * ) Notice: Subject to any disclaimer, the term of this patent is extended or adjusted under 35 U.S.C. 154(b) by 239 days.

(21) Appl. No.: 10/000,354

(22) Filed: Dec. 4, 2001

(65) Prior Publication Data

US 2002/0066436 A1 Jun. 6, 2002

(30) Foreign Application Priority Data

| Dec. 4, 2000 | (JP) | ............................. 2000-368501 |
| Dec. 15, 2000 | (JP) | ............................. 2000-382519 |
| Nov. 5, 2001 | (JP) | ............................. 2001-339553 |
| Nov. 14, 2001 | (JP) | ............................. 2001-348534 |

(51) Int. Cl.$^7$ .............................. F01L 1/34; F02M 51/00
(52) U.S. Cl. .................. 123/399; 123/406.47; 123/478; 123/90.15; 123/491; 60/284
(58) Field of Search ............................. 123/399, 90.15, 123/478, 406.47, 491; 60/284

(56) References Cited

U.S. PATENT DOCUMENTS

| 5,685,276 A | * | 11/1997 | Tanaka et al. ............... 123/478 |
| 6,055,948 A | * | 5/2000 | Shiraishi et al. .......... 123/90.15 |
| 6,062,201 A | * | 5/2000 | Nozawa et al. .............. 123/478 |
| 6,209,516 B1 | * | 4/2001 | Yamashita ................... 123/305 |
| 6,325,047 B2 | * | 12/2001 | Kawakami .............. 123/406.64 |
| 6,425,369 B2 | * | 7/2002 | Arai et al. ................... 123/348 |
| 2002/0129796 A1 | * | 9/2002 | Shimizu ....................... 123/500 |

FOREIGN PATENT DOCUMENTS

| JP | 6-117348 | | 4/1994 | |
| JP | 6-323168 | | 11/1994 | |
| JP | 346764 | * | 12/1994 | ............ F02D/13/02 |
| JP | 261034 | * | 10/1996 | ............ F01L/1/34 |

* cited by examiner

Primary Examiner—Hieu T. Vo
Assistant Examiner—Hai Huynh
(74) Attorney, Agent, or Firm—Nixon & Vanderhye P.C.

(57) ABSTRACT

During an operation to warm up a catalyst at an early time, an engine control apparatus adjusts an intake valve to a target opening position, which is set to provide a sufficient flow velocity of a flow of intake air flowing through the intake valve. Thus, fuel stuck on the intake passage is evaporated and, in addition, mixed gas in a combustion chamber is well agitated. Furthermore, the engine control unit controls a fuel injection period, a fuel injection timing and an ignition timing in accordance with the opening timing of the intake valve. Therefore, an amount of stuck fuel is reduced according to increase in the flow velocity of intake air.

30 Claims, 22 Drawing Sheets

| OPENING POSITION (BTDC °CA) | 10 | 0 | -10 | -20 | -30 |
|---|---|---|---|---|---|
| $\gamma$ | 1.1 | 1 | 0.95 | 0.9 | 0.85 |

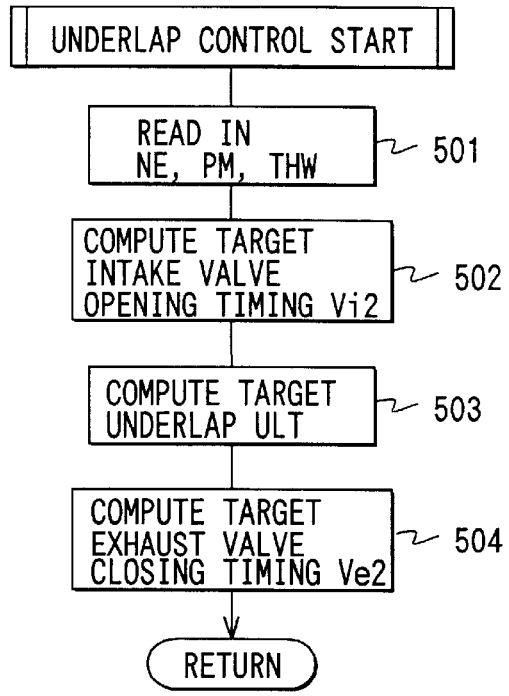

CONTROL APPARATUS FOR INTERNAL COMBUSTION ENGINE

CROSS REFERENCE TO RELATED APPLICATIONS

This application is based on and incorporates herein by reference Japanese Patent Applications No. 2000-368501 filed on Dec. 4, 2000, No. 2000-382519 filed on Dec. 15, 2000, No. 2001-339553 filed on Nov. 5, 2001, and No. 2001-348534 filed on Nov. 14, 2001.

BACKGROUND OF THE INVENTION

1. Field of the Invention

The present invention relates to a control apparatus for an internal combustion engine provided with a variable valve timing mechanism.

2. Related Art

In recent years, there has been developed a technology for activating a catalyst at an early time after an internal combustion engine is started to meet requirements according to an emission regulation. In accordance with this technology, in order to activate a thee-way catalyst at an early time, the temperature of the catalyst is increased at an early time by deliberately exhausting incompletely combusted fuel by retarding an ignition angle (crankshaft angle corresponding to ignition timing).

A technology to increase the temperature of a three-way catalyst at an early time is disclosed in JP-A-6-117348. In order to warm up a three-way catalyst in accordance with this disclosed technology, retard angle control of an ignition timing is executed. Control is also executed to open an intake valve during a period in which a piston in the internal combustion engine moves from the top dead center to the bottom dead center in a transition from a gas exhaust stroke to a gas intake stroke. By executing such ignition angle retard control, the speed of combustion is reduced. Thus, if the intake valve is opened with a normal timing, combusted gas will flow in the reverse direction into the intake passage. It is therefore likely that a backfire occurs. By executing the control of the intake valve, however, the combusted gas can be prevented from flowing in the reverse direction into the intake passage. As a result, a backfire phenomenon can be prevented from occurring during the control of the ignition angle retarding.

In addition, as control executed at a start of the internal combustion engine, there is known control to correct a fuel injection volume at the start of the engine by increasing the volume in order to start the engine with a high degree of reliability. One reason to correct the fuel injection volume is that, at a cold start of the internal combustion engine, a low temperature of the engine affects the degree of evaporation of the fuel. Specifically, the lower the temperature of water, the more difficult it is for the fuel to evaporate. That is, some of fuel injected by an injector unavoidably sticks on the intake passage and/or the intake valve. Since a large amount of fuel is stuck on the intake passage and/or the intake valve at a low temperature of the internal combustion engine, it is necessary to correct the fuel injection volume by increasing the fuel injection volume.

If a large amount of fuel is stuck on the intake passage and/or the intake valve, some of the stuck fuel is difficult to remove. Therefore the volume of fuel flowing into the combustion chamber tends to vary. As a result, combustion of fuel also becomes unstable and control of an air-fuel ratio becomes difficult to execute as well.

SUMMARY OF THE INVENTION

It is thus a first object of the present invention to provide a variable valve timing apparatus capable of providing stable combustion of fuel even if the control of an ignition angle retarding is executed.

In order to achieve the first object of the present invention, there is provided an internal combustion engine executing ignition angle retarding control of an ignition timing in order to warm up a catalyst at an early time, wherein, at a cold start of the engine, a timing to open an intake valve is set at a retard angle and control of fuel injection is executed in accordance with a timing to open the intake valve at a retard angle.

By setting the timing to open an intake valve at a retard angle, a closed state of the intake valve is sustained even after a piston of the internal combustion engine passes the top dead center, moving toward the bottom dead center. As a result, a pressure in a combustion chamber is relatively low in comparison with a pressure in an intake passage. In this state, the intake valve is opened so that the flow velocity of gas increases due to the difference between the pressure in the combustion chamber and the pressure in the intake passage. When the intake valve starts to open, the flow velocity of the gas increases in particular. This is because intake air flows into the combustion chamber through a small area. Thus, by controlling injection of fuel so as to take in the fuel to the combustion chamber with this timing, atomization of the fuel is promoted to result in good combustion. In addition, since this control is executed at a cold start, the amount of fuel stuck on the intake passage can be reduced due to the increased flow velocity of the fuel. With the reduced amount of fuel stuck on the intake passage, the amount of exhausted gas such as an HC gas also decreases as well.

It is a second object of the present invention to provide a control apparatus for an internal combustion engine capable of executing stable control of an air-fuel ratio by reducing a correction quantity for increasing a fuel volume and the amount of fuel stuck on the intake passage.

In order to achieve the second object of the present invention, a timing to open an intake valve and/or a lift quantity are adjusted to increase the flow velocity of fuel. The fuel injection volume is corrected to reduce the amount of fuel stuck on the intake system on the basis of the timing to open the intake valve and/or the adjusted lift quantity.

BRIEF DESCRIPTION OF THE DRAWINGS

The above and other objects, features and advantages of the present invention will become more apparent from the following detailed description made with reference to the accompanying drawings. In the drawings:

FIG. 13 is a flow diagram showing an underlap control executed by the second embodiment;

FIG. 14 is a table showing data of opening timing of the intake valve in relation to air pressure and engine speed;

FIG. 15 is a table showing data of closing timing of the exhaust valve in relation to air pressure and engine speed;

DETAILED DESCRIPTION OF PREFERRED EMBODIMENTS

The present invention is described in detail with reference to various embodiments directed to a gasoline internal combustion engine.

First Embodiment

Figure 1:
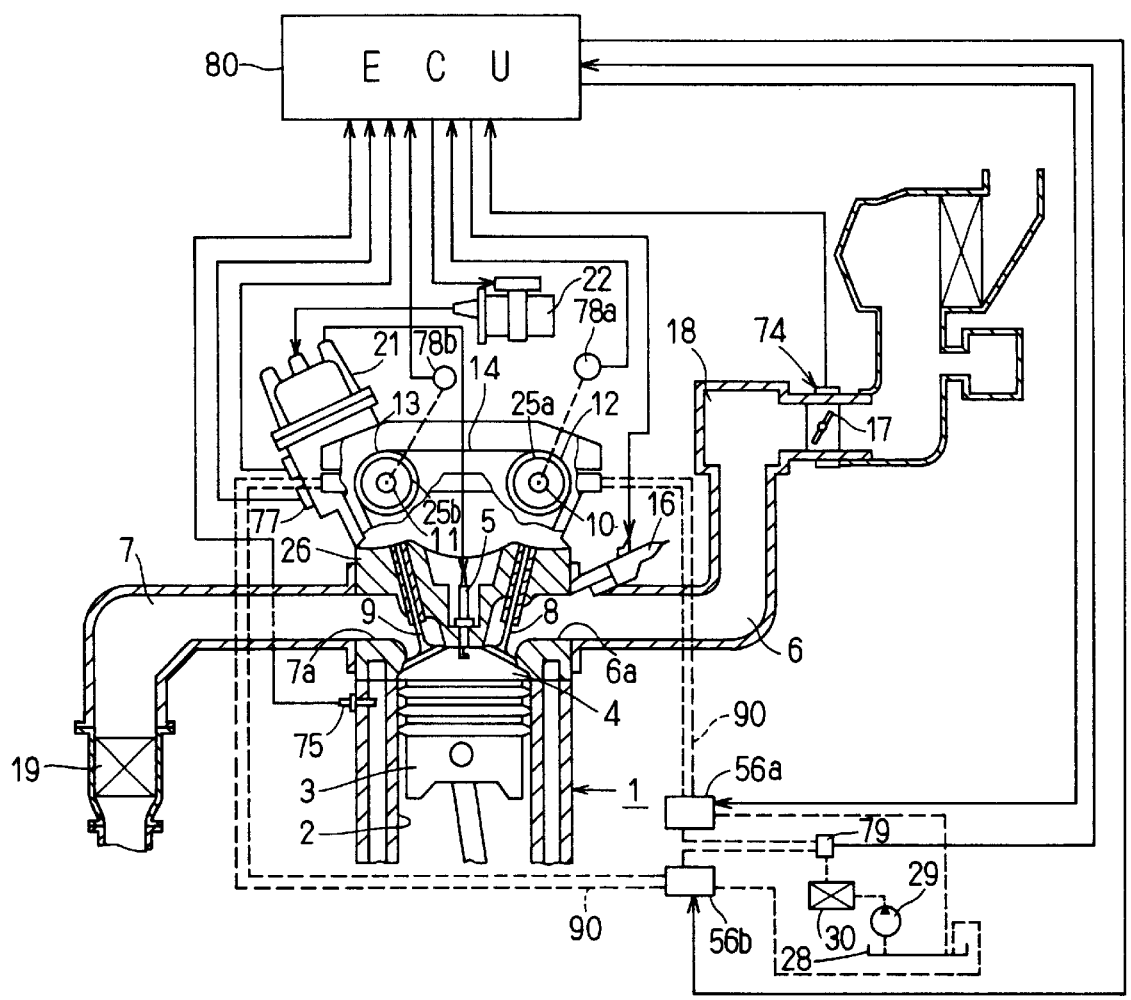
FIG. 1 is a schematic diagram showing a first embodiment of the present invention.

Referring to FIG. 1, an internal combustion engine 1 includes a piston 3 movable up and down inside each cylinder 2. A combustion chamber 4 is formed on the upper side of the piston 3. An ignition plug 5 is provided on the combustion chamber 4. The combustion chamber 4 is connected to an intake passage 6 and an exhaust passage 7 through an intake port 6a and an exhaust port 7a, respectively.

On the downstream side of the exhaust passage 7, a three-way catalyst 19 is provided for removing unburned gas (HC, etc.). Any catalyst can be provided on the downstream side of the exhaust passage 7 as long as the catalyst is capable of adsorbing or occluding HC gas, etc. A plurality of such catalysts can also be combined and installed on the downstream side of the exhaust passage 7.

On the intake port 6a, an intake valve 8 is provided for opening and closing the intake port 6a. On the exhaust port 7a, an exhaust valve 9 is provided for opening and closing the exhaust port 7a. The intake valve 8 and the exhaust valve 9 are driven by rotations of an intake-side camshaft 10 and an exhaust-side camshaft 11, respectively. On one side of the intake-side camshaft 10, an intake-side timing pulley 12 is provided. On one side of the exhaust-side camshaft 11, an exhaust-side timing pulley 13 is provided. The intake-side pulley 12 and the exhaust-side pulley 13 are linked to a crankshaft (not shown) by a timing belt 14 to be driven by the crankshaft.

Thus, in operation of the engine 1, a rotation power propagates from the crankshaft to the intake-side camshaft 10 and the exhaust-side camshaft 11 by way of the timing belt 14 and the intake-side pulley 12 and the exhaust-side pulley 13 respectively. The intake-side camshaft 10 and the exhaust-side camshaft 11 rotate to open and close the intake valve 8 and the exhaust valve 9, respectively. The intake valve 8 and the exhaust valve 9 are driven to open and close with predetermined opening and closing timings synchronously with the rotation of the crankshaft, that is, synchronously with 4 strokes, that is, an intake stroke, a compression stroke, an explosion stroke and an exhaust stroke. An injector 16 for injecting fuel is provided at a position close to the intake port 6a provided on each of the cylinder.

A throttle valve 17 is provided at a location in about the middle of the intake passage 6. The throttle valve 17 is electrically controlled to open and close the intake passage 6 by an operation carried out on an accelerator pedal. By opening and closing the throttle valve 17, it is possible to adjust the amount of external air introduced into the intake passage 6, that is, the intake air volume. On the downstream of the throttle valve 17, there is provided a surge tank 18 for smoothing intake air fluctuations.

At a location close to the throttle valve 17, there is installed a throttle sensor 74 for detecting a throttle opening TA. In addition, the engine 1 includes a water-temperature sensor 75 for detecting the temperature of water. The temperature of water is referred to hereafter as a water temperature THW.

An ignition signal distributed by a distributor 21 is applied to the ignition plug 5. The distributor 21 includes an embedded rotor, which is linked to the exhaust-side camshaft 11 and rotates synchronously with the rotation of the crankshaft. On the distributor 21, a rotational-speed sensor 76 is installed for detecting the speed of the engine 1 by sensing the rotation of the rotor. The speed of the engine 1 is defined as the number of rotations per minute. On the distributor 21, a cylinder-identification sensor 77 is also installed for detecting a crankshaft rotation reference position GP of the engine 1 at a predetermined rate. In this embodiment, the crankshaft makes 2 rotations during a sequence of 4 strokes of the engine 1. The rotational-speed sensor 76 detects a crankshaft angle at a rate of 30 degrees CA (crankshaft angle) per pulse. On the other hand, the cylinder-identification sensor 77 detects a crankshaft angle at a rate of 360 degrees CA per pulse.

Installed on the intake-side pulley 12, an intake-side variable valve timing mechanism 25a is driven by an oil pressure in an oil-pressure operation system in order to change the opening/closing timing of the intake valve 8. An exhaust-side variable valve timing mechanism 25b is installed on the exhaust-side pulley 13.

An oil reservoir 28 and an oil pump 29 constitute an engine lubrication system of the embodiment. The oil pump 29 pumps up oil from the oil reservoir 28. The oil pumped up by the oil pump 29 flows into an oil path 90. The oil flowing into the oil path 90 is controlled by an intake-side oil control valve 56a to press the intake-side variable valve timing mechanism 25a to the advance angle side or the retard angle side. The oil path 90 is split so that the oil flowing into the oil path 90 is controlled by an exhaust-side oil control valve 56b to press the exhaust-side variable valve timing mechanism 25b to the advance angle side or the retard angle side in the same way as the oil is controlled by the intake-side variable valve timing mechanism 25a.

The intake-side oil control valve 56a and the exhaust-side oil control valve 56b are each an electromagnetically driven solenoid valve. They each determine a spool quantity according to the duty ratio of an applied voltage. In this embodiment, by determining a spool quantity, the intake-side oil control valve 56a and the exhaust-side oil control valve 56b are capable of putting respectively the intake-side variable valve timing mechanism 25a and the exhaust-side variable valve timing mechanism 25b in an advance angle state or a retard angle state. As the intake-side oil control valve 56a and the exhaust-side oil control valve 56b, the generally known conventional control valves can also be used.

The intake-side variable valve timing mechanism 25a and the exhaust-side variable valve timing mechanism 25b each have a vane (not shown). By applying pressure pushing the vane to the advance angle side or the retard angle side, the intake-side variable valve timing mechanism 25a or the exhaust-side variable valve timing mechanism 25b can be put in the advance angle state or the retard angle state, respectively. The configurations of the intake-side variable valve timing mechanism 25a and the exhaust-side variable valve timing mechanism 25b can also be a helical-type variable valve timing configuration. In addition, it is also possible to employ a variable valve timing configuration that is capable of setting a valve timing and a lift quantity with a high degree of freedom by application of electromagnetic driving.

The intake-side oil control valve 56a and the exhaust-side oil control valve 56b for putting respectively the intake-side variable valve timing mechanism 25a and the exhaust-side variable valve timing mechanism 25b in the advance angle state or the retard angle state are electrically connected to an ECU (electronic control unit) 80 for controlling each of the intake-side oil control valve 56a and the exhaust-side oil control valve 56b in determination of a spool quantity.

Figure 2:
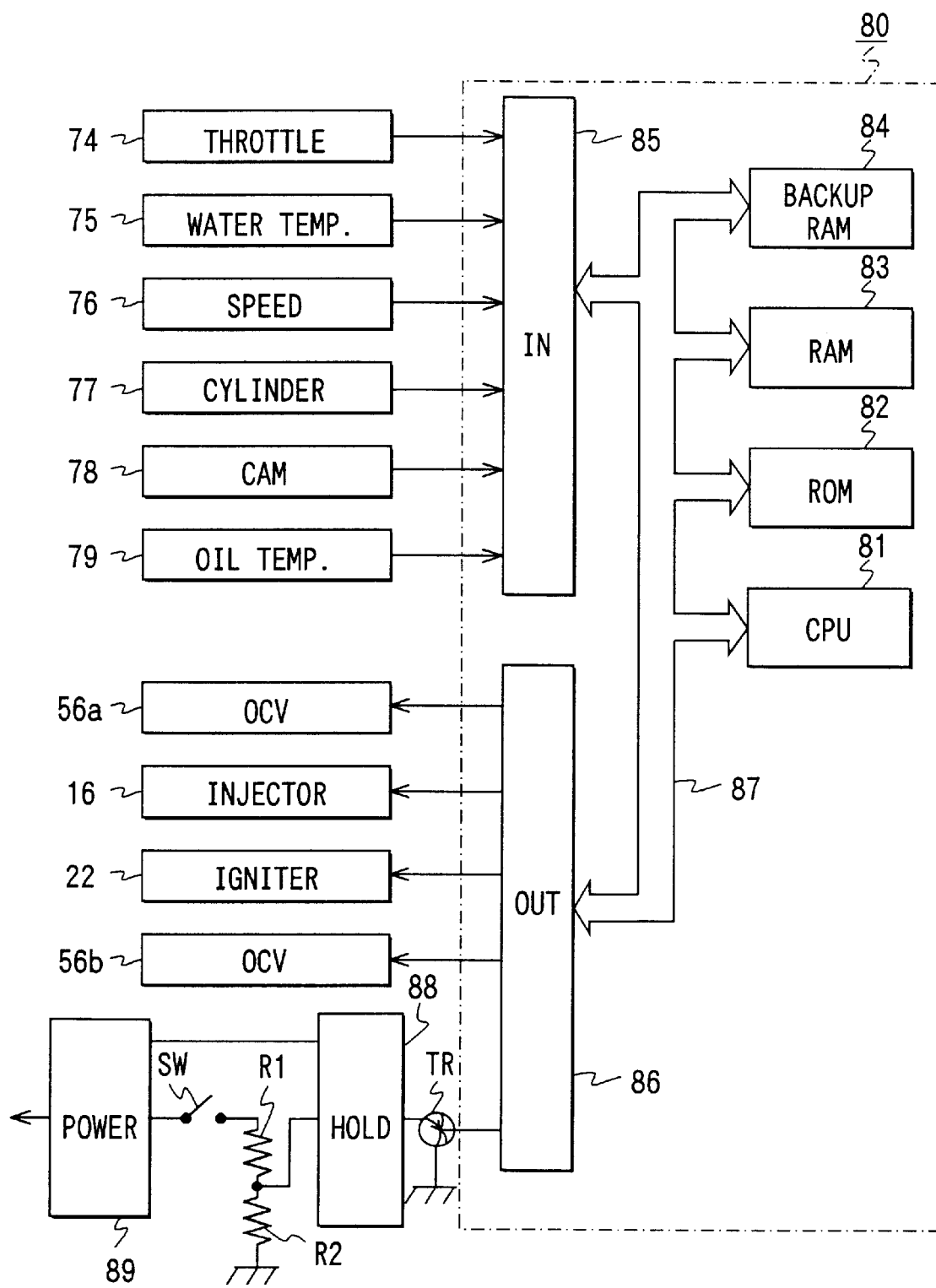
FIG. 2 is a block diagram showing electronic control parts of the first embodiment.

The ECU 80 is constructed as shown in FIG. 2. The ECU 80 is connected to the throttle sensor 74, the water-temperature sensor 75, the rotational-speed sensor 76, the cylinder-identification sensor 77, a cam rotational-angle sensor 78, and an oil-temperature sensor 79. The ECU 80 controls the injector 16, the igniter 22, the intake-side oil control valve 56a and the exhaust-side oil control valve 56b on the basis of signals output by the sensors 74 to 79.

The ECU 80 comprises components including a CPU (central processing unit) 81, a read-only memory (ROM) 82 for storing predetermined control programs, a random-access memory (RAM) 83 for temporarily storing data such as processing results output by the CPU 81 and a backup RAM 84. The ECU 80 also includes other components such as an input circuit 85 and an output circuit 86, which are connected to each other and to the parts 81 to 84 via a bus 87.

The input circuit 86 is connected to the throttle sensor 74, the water-temperature sensor 75, the rotational-speed sensor 76, the cylinder-identification sensor 77, the cam rotational-angle sensor 78 and the oil-temperature sensor 79. On the other hand, the output circuit 86 is connected to the injectors 16, the igniter 22, the intake-side oil control valve 56a and the exhaust-side oil control valve 56b.

The CPU 81 inputs detection signals generated by the sensors 74 to 79 and a variety of other sensors (not shown) through the input circuit 85, and stores the detection signals in predetermined areas in the RAM 83 from time to time as input values. The CPU 81 controls the injector 16, the igniter 22, the intake-side oil control valve 56a and the exhaust-side oil control valve 56b on the basis of the input values received from the throttle sensor 74 to the oil-temperature sensor 79 and the other sensors in order to execute various kinds of control such as control of a fuel injection volume, control of an ignition timing, control of an idle speed and control of a valve timing.

In addition, it is also possible to use a circuit configuration, wherein voltages generated by a power supply are applied to circuits after an ignition switch is turned off in order to control valve timing after the ignition switch is turned off.

In detail, the output circuit 86 is connected to the base of a transistor TR. The emitter of the transistor TR is connected to an input terminal of a power-supply holding circuit 88. The collector of the transistor TR is connected to the ground.

Another input terminal of the power-supply holding circuit 88 is connected to a power-supply circuit 89 including a battery by an ignition switch SW. A resistor R1 is connected between the switch SW and the power-supply holding circuit 88. The negative end of the resistor R1 is connected to the ground through a resistor R2. The output terminal of the power-supply holding circuit 88 is connected to the power-supply circuit 89. The power-supply circuit 89 is connected to a variety of electrical circuits mounted on the vehicle to supply stable powers to the circuits. The operation of the power-supply circuit 89 is started on a rising edge of the high level signal generated by the power-supply holding circuit 88 and ended on the falling edge of the signal.

When the switch SW is turned on, the power-supply holding circuit 88 outputs the high level signal from its output terminal. When the output circuit 86 outputs a driving signal to the transistor TR, the transistor TR operates, causing the power-supply holding circuit 88 to output the high level signal from its output terminal. It should be noted that the power-supply holding circuit 88 can be implemented by using an OR gate and a relay.

Figure 3:
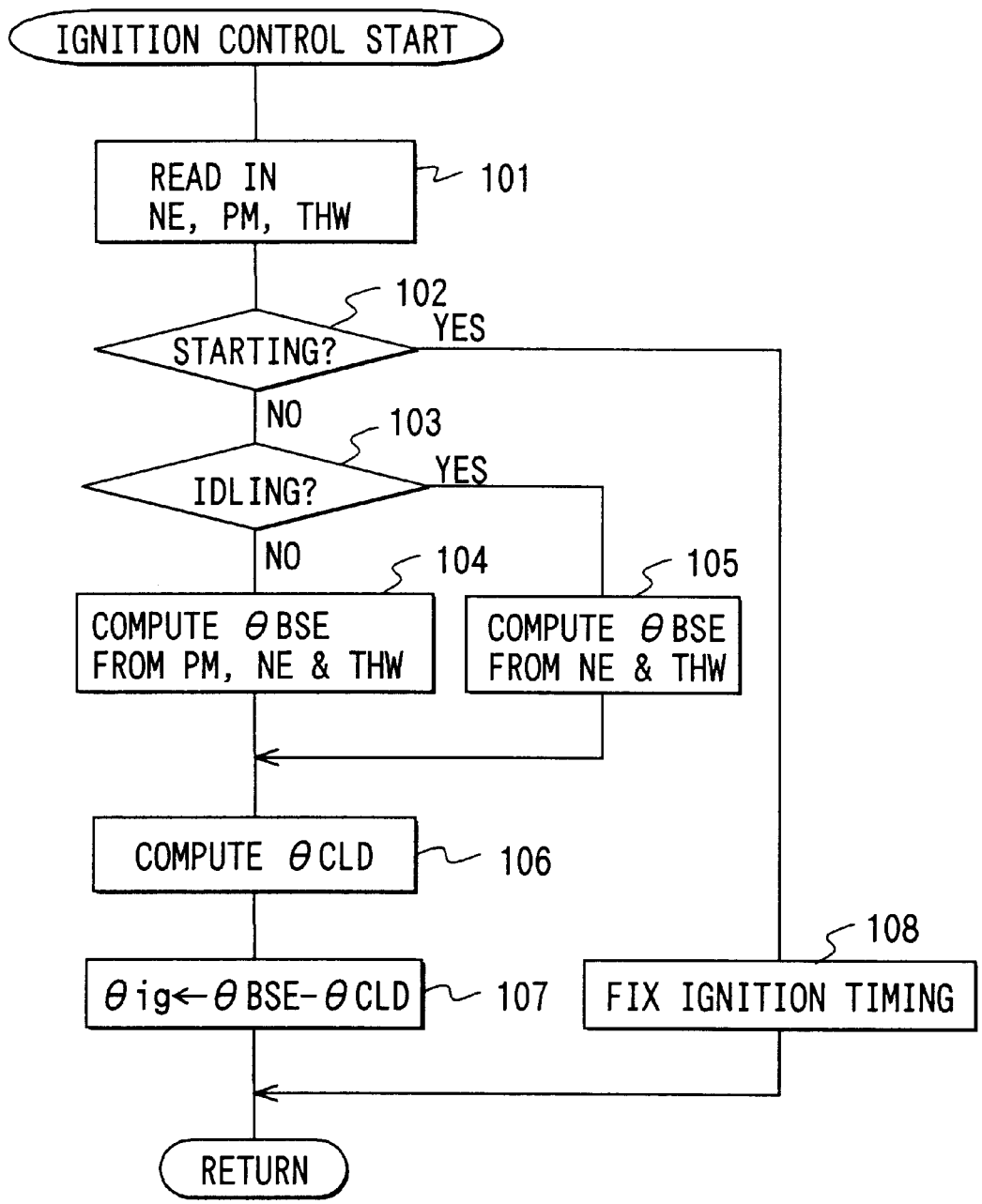
FIG. 3 is a flow diagram showing ignition timing control executed by the first embodiment.

The ECU 80 is programmed to execute ignition timing control shown in FIG. 3 to raise the temperature of the three-way catalyst 19 quickly, that is, at an early time after engine starting. The processing starts, in the course of execution of a main routine shown in FIG. 6, with step 101 at which pieces of information such as the engine speed NE, the intake passage pressure PM and the water temperature THW are read in. The engine speed NE, the intake passage pressure PM and the engine water temperature THW are input because, at later steps, the engine speed NE and the intake passage pressure PM will be used as parameters in computation of a basic ignition timing $\theta$ BSE whereas the engine water temperature THW will be used as a parameter in computation of a retard angle correction value $\theta$ CLD for the basic ignition timing $\theta$ BSE.

Then, the processing proceeds to step 102 to determine whether the engine speed NE detected at step 101 is a start-time speed. A typical start-time rotational speed is 1,000 rpm. The start-time rotational speed maybe 400 rpm. The start time may be detected by any parameters other than the rotational speed. The start-time needs to be detected because, at a start time, it is not necessary to set the ignition timing at a retard angle in order to stabilize combustion. After the start time, on the other hand, it is necessary to set the ignition timing at a retard angle in order to warm up the catalyst at an early time.

If the engine speed NE is determined to be the start-time speed at step 102, the processing proceeds to step 108 at which information on a fixed ignition timing is stored at a predetermined address before the execution of this routine is ended. If the engine speed NE is determined not to be the start-time speed at step 102, on the other hand, the processing proceeds to step 103 to determine whether the operating state of the internal combustion engine 1 is an idle operation.

If the operating state of the internal combustion engine 1 is determined to be the idle operation, the processing proceeds to step 105 at which a basic ignition timing $\theta$ BSE is computed from the engine speed NE and the engine water temperature THW. The processing then proceeds to step 106. If the operating state of the internal combustion engine 1 is determined to be not an idle operation, on the other hand, the processing proceeds to step 104 at which the basic ignition timing $\theta$ BSE is computed from the engine speed NE, the intake passage pressure PM and the engine water temperature THW. The processing then proceeds to step 106.

At step 106, a retard angle correction value $\theta$ CLD is computed from the engine water temperature THW. After the basic ignition timing $\theta$ BSE and the retard angle correction value $\theta$ CLD are computed at steps 104 to 106, the processing proceeds to step 107 at which the ignition timing $\theta$ ig ($\theta$ BSE–$\theta$ CLD) is computed and stored at a predetermined address. The processing then returns to the main routine shown in FIG. 6.

Figures 4, 5:
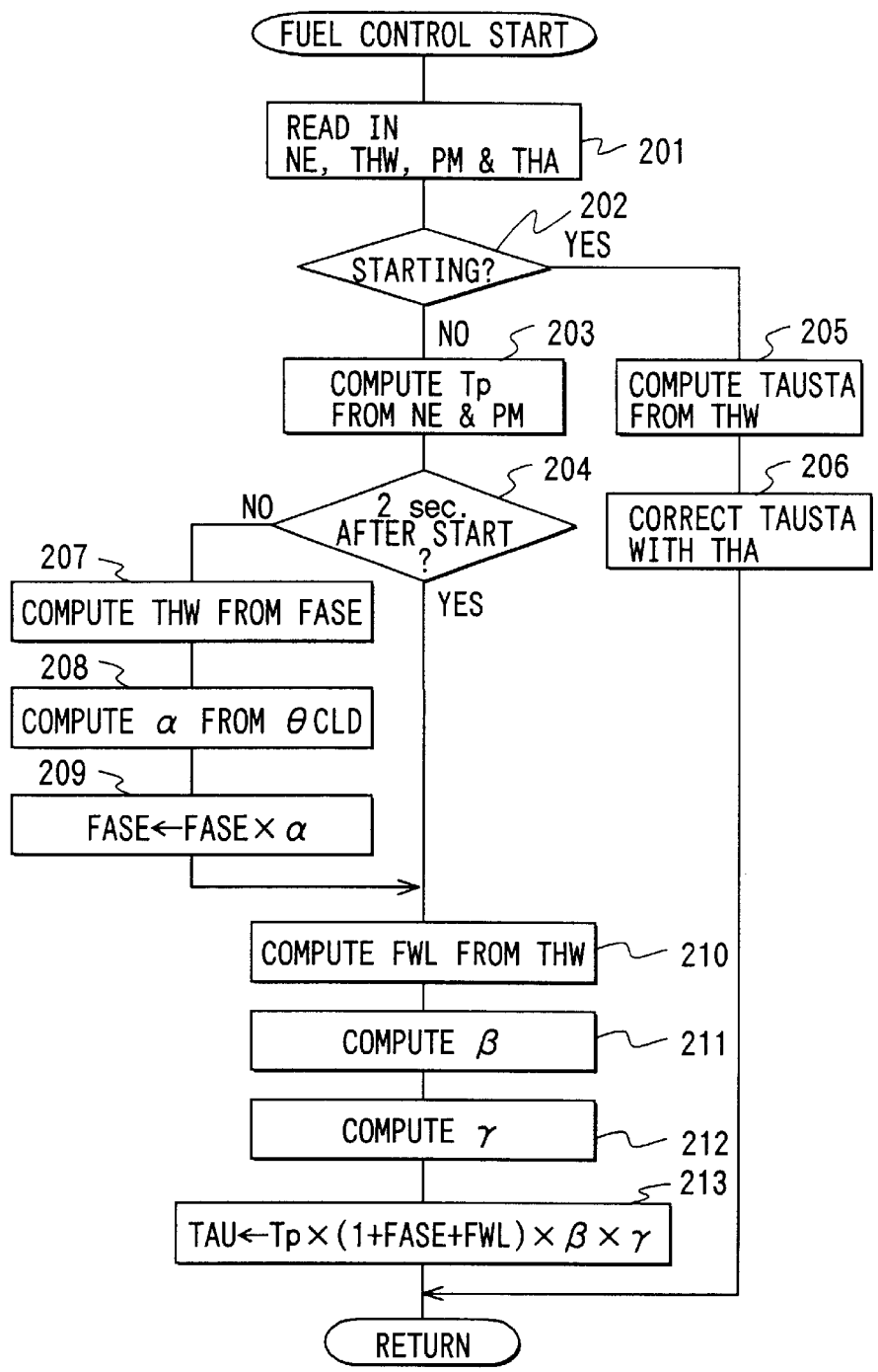
FIG. 4 is a flow diagram showing fuel-injection control executed by the first embodiment.
FIG. 5 is a table used in fuel-injection-volume correction carried out by the first embodiment.

FIG. 4 is a flow diagram showing a process of computing a fuel injection volume TAU suitable for an ignition timing. At the first step 201, the engine speed NE, the intake passage pressure PM, the engine water temperature THW and the intake air temperature THA are read in. Then, the processing proceeds to step 202 to determine whether the operating state of the internal combustion engine 1 is an start time operating state.

If the operating state of the internal combustion engine 1 is determined to be an start time operating state, the processing proceeds to step 205 at which a start time fuel injection volume TAUSTA for engine starting is computed from the engine water temperature THW read in at step 201. Then, the processing proceeds to step 206. At step 206, the start-time fuel injection volume TAUSTA is corrected by using the engine speed NE and the intake air temperature THA. Then the execution of this routine returns to the main routine.

If the operating state of the internal combustion engine 1 is determined at step 202 to be not the start time operating state, on the other hand, the processing proceeds to step 203 at which the basic fuel injection time (volume) Tp is computed from the engine speed NE and the intake passage pressure PM. Then, the processing proceeds to step 204 to determine whether a period of at least 2 seconds has lapsed after the start of the internal combustion engine 1. If a period of at least 2 seconds has lapsed since after the start of the internal combustion engine 1, the processing proceeds to step 210. If a period of 2 seconds has not lapsed after the start of the internal combustion engine 1, on the other hand, processing of steps 207 to 209 are carried out.

First of all, at step 207, a after-start fuel increase coefficient FASE is computed from the engine water temperature THW read in at step 201. The after-start fuel increase coefficient FASE is computed from the engine water temperature THW to be used for reducing the fuel injection volume gradually during a period beginning at the start time and ending at a after-start time. By reducing the fuel injection volume as such, the air-fuel ratio will gradually enter a region on the lean side as soon as the operating state of the internal combustion engine 1 transits from the start-time state to the after-start state.

Then, at the next step 208, a correction coefficient $\alpha$ is computed from the retard angle correction value $\theta$ CLD computed at step 106 of the ignition timing computation routine shown in FIG. 3. Subsequently, at the next step 209, a fuel increase coefficient FASE is determined as a product of the after-start fuel increase coefficient FASE and the correction coefficient $\alpha$, that is, FASE=FASE×$\alpha$ before the processing proceeds to step 210. At step 210, a warming-up fuel increase coefficient FWL is computed from the engine water temperature THW read in at step 201. The processing then proceeds to step 211. At step 211, another correction coefficient $\beta$ is computed. The processing then proceeds to step 212. At step 212, a correction coefficient $\gamma$ for an opening timing (opening position) of the intake valve 8 is computed. Control of the opening timing of the intake valve 8 will be described later. The correction coefficient $\gamma$ is computed a method using a data map shown in FIG. 5. In the map shown in FIG. 5, the correction coefficient γ is set at values that provide a larger fuel injection volume for a larger retard angle of the valve opening timing.

Then, at the next step 213, the final fuel injection volume TAU is computed from the basic fuel injection Tp and the variety of correction coefficients in accordance with the following equation:

$$TAU=Tp\times(1+FASE+FWL)\times\beta\times\gamma$$

Figure 6:
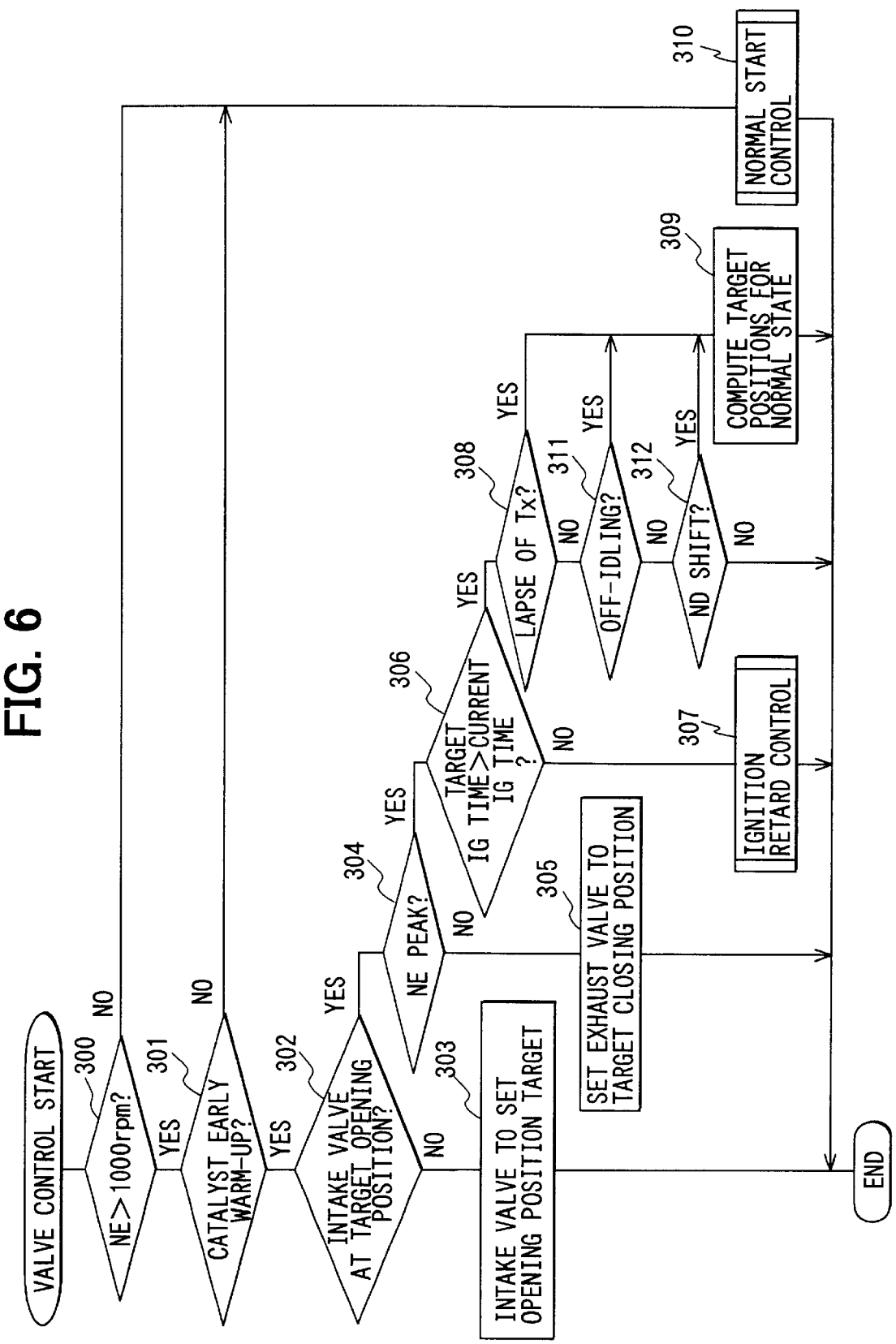
FIG. 6 is a flow diagram showing main control executed by the first embodiment.

Then, the execution of this routine returns to the main routine shown in FIG. 6.

The following description explains the opening-timing control of the intake valve 8 referring to the main routine shown in FIG. 6. This routine starts with step 300 to determine whether the engine speed NE is equal to or greater than a predetermined value (1,000 rpm). Since the variable valve timing mechanism is driven by oil pressure, consideration of the need to drive the variable valve timing mechanism sufficiently makes it desirable to set the predetermined value at 1,000 rpm or greater. If the result of the determination indicates that the engine 1 has not been started, the processing proceeds to step 310.

If the engine speed NE is determined at least equal to the predetermined value of 1,000 rpm, on the other hand, the processing proceeds to step 301 to determine whether a condition for executing an operation to warm up the catalyst at an early time is satisfied on the basis of the engine speed NE, the THW and the fuel control. If the condition is not satisfied, the processing proceeds to step 310 at which the normal start control is executed. In the normal start control, no ignition angle retarding is set and the opening timing of the intake valve 8 and the closing timing of the exhaust valve 9 are controlled in the conventional manner. That is, the known conventional start-time control of the intake valve 8 and the exhaust valve 9 is executed.

If the determination result at step 301 indicates that the condition for executing an operation to warm up the catalyst at an early time is satisfied, on the other hand, the processing proceeds to step 302 to determine whether the intake valve 8 is set at a target opening position. If the intake valve 8 is set not at the target opening position, the processing proceeds to step 303 at which the intake valve 8 is set at the target opening position. Then, the execution of the routine ends.

Figure 7:
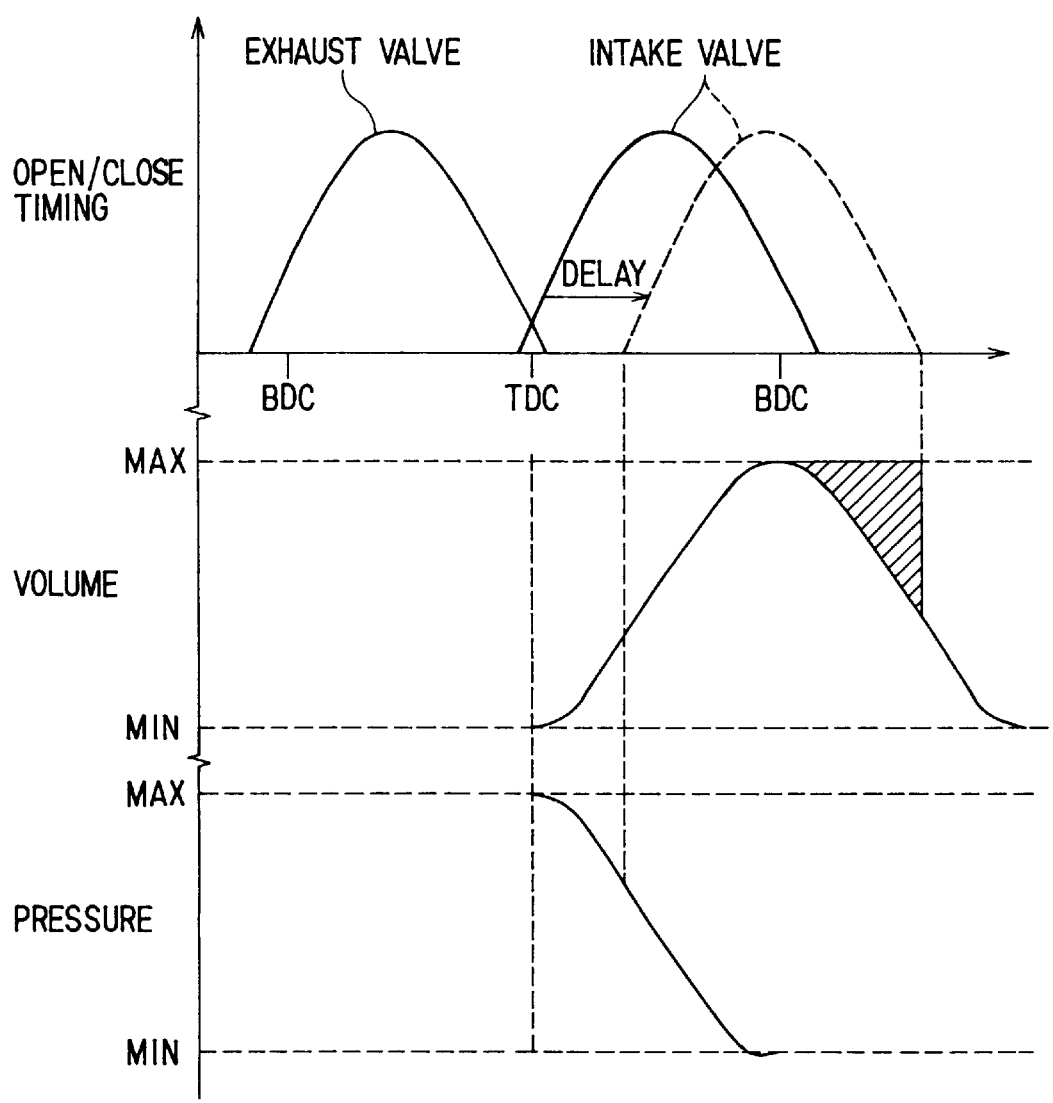
FIG. 7 is a timing diagram showing processing to set the target opening position of an intake valve employed in the first embodiment.

Control of the target opening position of the intake valve 8 is explained by referring to timing diagram shown in FIG. 7. In FIG. 7, the opening and closing timing of the intake valve 8 and the exhaust valve 9 are shown. The dashed line shows the opening and closing timing of the intake valve 8 after opening angle retardation (opening delay), that is, the target opening position. The target opening position is set from the volume of the combustion chamber and the pressure in the chamber as shown.

The target opening position of the intake valve 8 is set so that the hatched portion in FIG. 7 becomes greater than a predetermined value, and the difference between the chamber pressure and the intake air pressure is at least equal to a predetermined value.

It should be noted that, as a condition for setting the target opening position of the intake valve 8, the position can also be set only from the chamber inner volume or only from the difference between the chamber pressure and the intake air pressure. In addition, in order to achieve an object to stabilize combustion, the target opening position can be set on the basis of an intake-air flow velocity. Specifically, the target opening position can be set by using characteristics shown in FIGS. 8 and 9.

Figure 8:
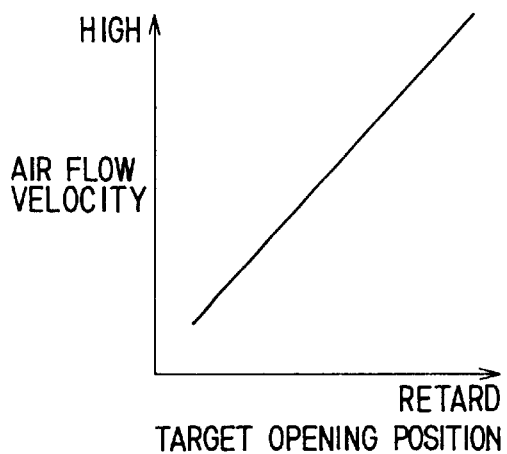
FIG. 8 is a graph showing a relation between the opening position of the intake valve and the flow velocity of intake-air.

FIG. 8 is a diagram showing a relation between the target opening position and the intake-air flow velocity for the intake valve 8. The target opening position is set at a position for obtaining an intake-air flow velocity large enough for agitating mixed gases in the combustion chamber. As is obvious from the characteristic shown in FIG. 8, the greater the retard angle at which the target opening position of the intake valve 8 is set, the higher the flow velocity of the intake-air.

Figure 9:
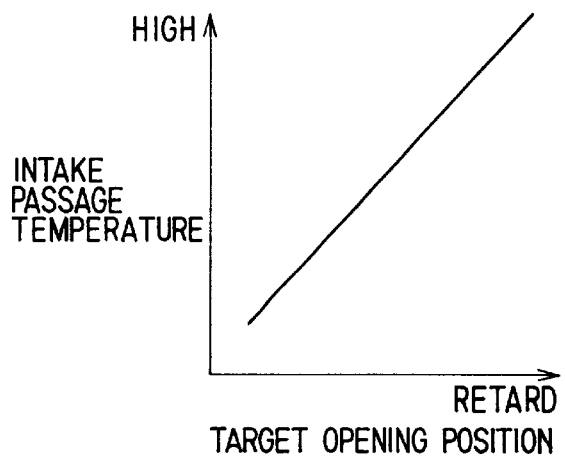
FIG. 9 is a graph showing a relation between the opening position of the intake valve and the temperature of intake air.

In addition, the characteristic shown in FIG. 9 indicates that, the greater the retard angle at which the target opening position of the intake valve 8 is set, the higher the temperature inside the intake passage 6. This relation shown in FIG. 9 can be used as a base for correction of the target opening position of the intake valve 8 shown in FIG. 8.

Figure 10:
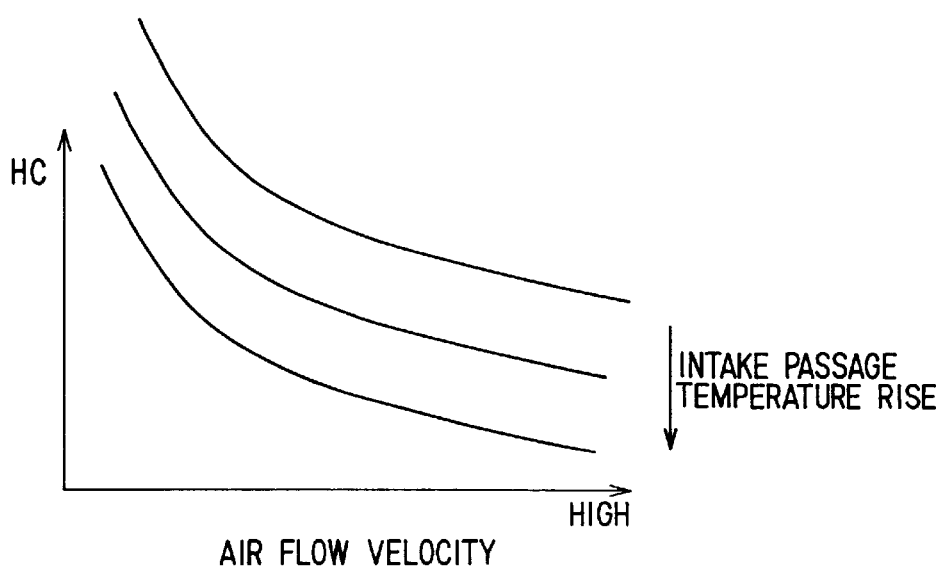
FIG. 10 is a graph showing a relation between the flow velocity of intake-air and the amount of gas exhausted by the engine.

FIG. 10 shows characteristic relation between the flow velocity of the intake-air and the amount of HC exhausted by the engine 1. As is obvious from the characteristics, the higher the flow velocity of the intake-air, the more the amount of HC exhausted by the engine 1 can be reduced. In addition, the higher the temperature inside the intake passage, the more the amount of HC exhausted by the engine 1 can be reduced. The relation shown in FIG. 10 can be used as a base for correction of the target opening position of the intake valve 8 shown in FIG. 3. Thus, the target opening position of the intake valve 8 is controlled to an optimum opening timing by considering the air pressure inside the intake passage and the flow velocity of the intake-air, and then utilizing the relation described above. In this instance, although the target opening timing is set to the optimum value, it maybe set to the advance side based on the above characteristics graphs when the target position of the intake valve 8 is corrected to the retard side relative to the intake TDC.

If the determination result at step 302 indicates that the intake valve 8 has reached the target opening position, the processing proceeds to step 304 to determine whether a peak for an initial explosion has been detected from the engine speed NE. If the peak for an initial explosion has not been detected, the processing proceeds to step 305 at which the exhaust valve 9 is set at a target closing position. Then, the execution of this routine ends.

If the determination result at step 304 indicates that the peak for the initial explosion has been detected, on the other hand, the processing proceeds to step 306 to compare a current ignition timing with the target ignition timing, which was determined by the ignition timing computing routine shown in FIG. 3 and used for warming up the catalyst at an early time, in order to determine whether the current ignition timing has reached the target ignition timing. If the current ignition timing has not reached the target ignition timing, the processing proceeds to step 307 at which ignition timing control (ignition retard control) for warming up the catalyst at an early time is executed. Then, the execution of the routine ends.

If the current ignition timing is determined to have reached the target ignition timing, on the other hand, the processing proceeds to step 308 to determine whether a predetermined period of time has lapsed since the current ignition timing reached the target ignition timing. If the predetermined period of time has lapsed since the current ignition timing reached the target ignition timing, the processing proceeds to step 311 to determine whether an idle operating state has disappeared, that is, change from engine idling to engine off-idling. If the idle operating state is determined to be continuing, the processing proceeds to step 312 to determine whether an ND (neutral-to-drive) shift has been carried out. If no ND shift has been carried out, the execution of the routine ends.

If the determination result at step 308, 311 or 312 is yes, on the other hand, the processing proceeds to step 309 at which the intake valve 8 and the exhaust valve 9 are restored to their respective positions proper for the normal operating state. Then, the execution of the routine ends. It is desirable to restore the exhaust valve 9 to the position proper for the normal operating state before restoring the intake valve 8 to the proper position proper for the normal operating state.

The following description explains why it is desirable to restore the exhaust valve 9 to the position proper for the normal operating state before restoring the intake valve 8 to the proper position proper for the normal operating state. Since setting the closing timing of the exhaust valve 9 at an advance angle will cause the amount of exhaust gas left in the combustion chamber to increase, it is likely that the combustion state gets worse. In the case of this embodiment, however, the exhaust valve 9 is put at an advance angle when the opening timing of the intake valve 8 is set at a retard angle. Thus, by increasing the flow velocity of the intake-air, the exhaust gas left in the combustion chamber can be agitated more. Therefore, by restoring the exhaust valve 9 to the position proper for the normal operating state before restoring the intake valve 8 to the proper position for the normal operating state in this way, it is possible to lower the degree of combustion state worsening caused by the exhaust gas left in the combustion chamber. In addition, since the exhausted gas can be reused in combustion, the fuel economy can be improved.

Figure 11:
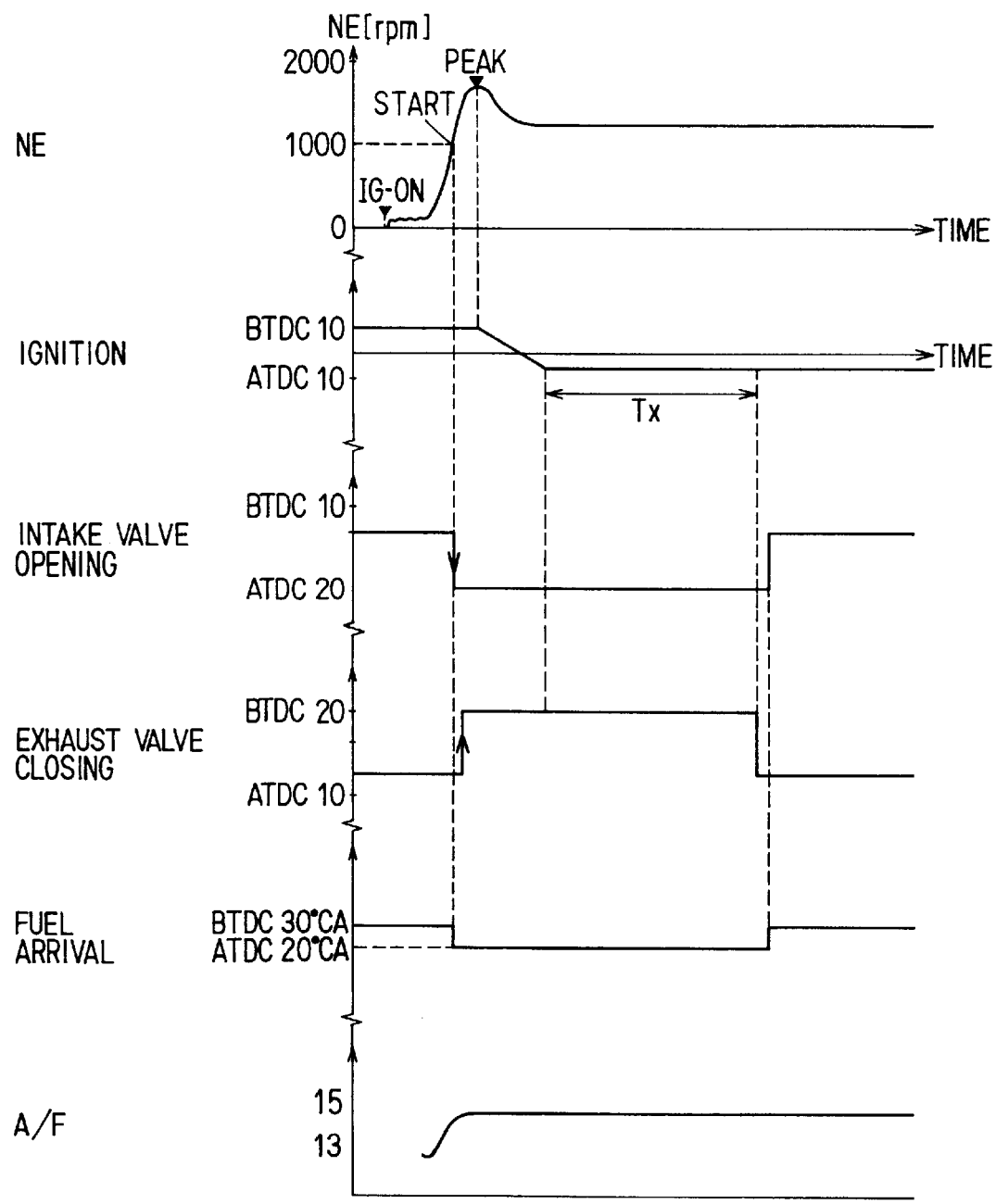
FIG. 11 is a timing diagram showing operation of the first embodiment.

The operation of this embodiment is shown in FIG. 11. When the ignition switch is turned on as indicated by notation IG-ON in the figure, a starter (not shown) is driven, causing the engine speed NE to rise. The engine 1 is determined to have been started when the engine 1 reaches a start criterion level due to the first explosion as evidenced by the engine speed NE exceeding typically 1,000 rpm.

At that time, the opening timing of the intake valve 8 is set at the retard angle and, by generating a difference in pressure between the intake air pipe and the combustion chamber, the flow velocity of the intake-air can be increased. In addition to the operation to raise the flow velocity of the intake-air, fuel arrival timing is set at a retard angle. The fuel arrival timing is a timing with which fuel injected by the injector 16 in fuel injection arrives in the combustion chamber. Thus, the fuel arrival timing is varied by changing the fuel injection timing. When the opening timing of the intake vale 8 is corrected in the advance side as above while it is retarded from the intake TDC, the flow velocity of the intake air becomes low. Therefore, it is preferred to increase the fuel injection quantity to counter decrease in evaporation of fuel in the combustion chamber. In this case, by setting the exhaust valve 9 at an advance angle, the amount of exhaust gas left in the combustion chamber is increased. The degree of combustion deterioration can be lowered by utilizing a phenomenon indicating that the flow velocity of the intake-air is increased by setting the intake valve 8 at a retard angle.

If the intake valve 8 and the fuel injection timing of the injector 16 are controlled, the closing timing of the exhaust valve 9 can be set at an advance angle. By setting the exhaust valve 9 at an angle more advanced than the closing timing at the start time, it is possible to leave some of gas exhausted by combustion in the combustion chamber. By setting the intake valve 8 at a retard angle, the flow velocity of the intake-air increases so that the exhaust gas left in the combustion chamber can be agitated and unburned components included in the exhaust gas can be recirculated in combustion. As such, even by setting the exhaust valve 9 at an advance angle, the combustion can be prevented from worsening to provide positive effect of improved fuel economy.

Then, as the engine speed NE approaches a peak after the first explosion, the ignition timing is set at a retard angle in order to warm up the catalyst at an early time. When the ignition timing reaches the target ignition timing, the timings of the intake valve 8 and the exhaust valve 9 are sustained till a predetermined period of time lapses since the ignition timing reaches the target ignition timing. As the predetermined period of time lapses, the exhaust valve 9 is restored to the start-time timing prior to restoration of the intake valve 8 to its start-time timing.

By executing the above control, good combustion is attained and fluctuation of the air-fuel mixture ratio (A/F) can be avoided.

In this embodiment, the function of a start-determining means is implemented by execution of step 202 of the flow diagram shown in FIG. 4 and the function of a retard angle control means is implemented by execution of the routine represented by the flow diagram shown in FIG. 3. The functions of a fuel injection volume control means and a first valve timing control means are implemented by execution of the routine represented by the flow diagram shown in FIG. 4 and step 303 of the flow diagram shown in FIG. 6 respectively. The function of a second valve timing control means is implemented by execution of step 305 of the flow diagram shown in FIG. 6, and the water temperature sensor 75 serves as a water temperature detecting means.

Second Embodiment

In the second embodiment which is an improvement of the first embodiment, the closing timing of the exhaust valve 9 is controlled in accordance with the opening timing of the intake valve 8. Specifically, in the second embodiment, during a period in which the opening timing of the intake valve 8 is set at a retard angle, the closing timing of the exhaust valve 9 is set at such an angle that the intake valve 8 is opened after the rotation of a predetermined angle of typically 20 degrees CA has been attained after the closing operation of the exhaust valve 9.

Normally, even if the exhaust valve 9 is closed, a small gap still exists between the exhaust valve 9 and the cylinder during a predetermined period of time. By execution of the control described above, however, it is possible to create a gas-tightly closed state of the exhaust valve 9 and the cylinder with a high degree of reliability. Thus, by setting the opening timing of the intake valve 8 at a retard angle, a negative pressure can be generated inside the cylinder with a high degree of efficiency.

Figure 12:
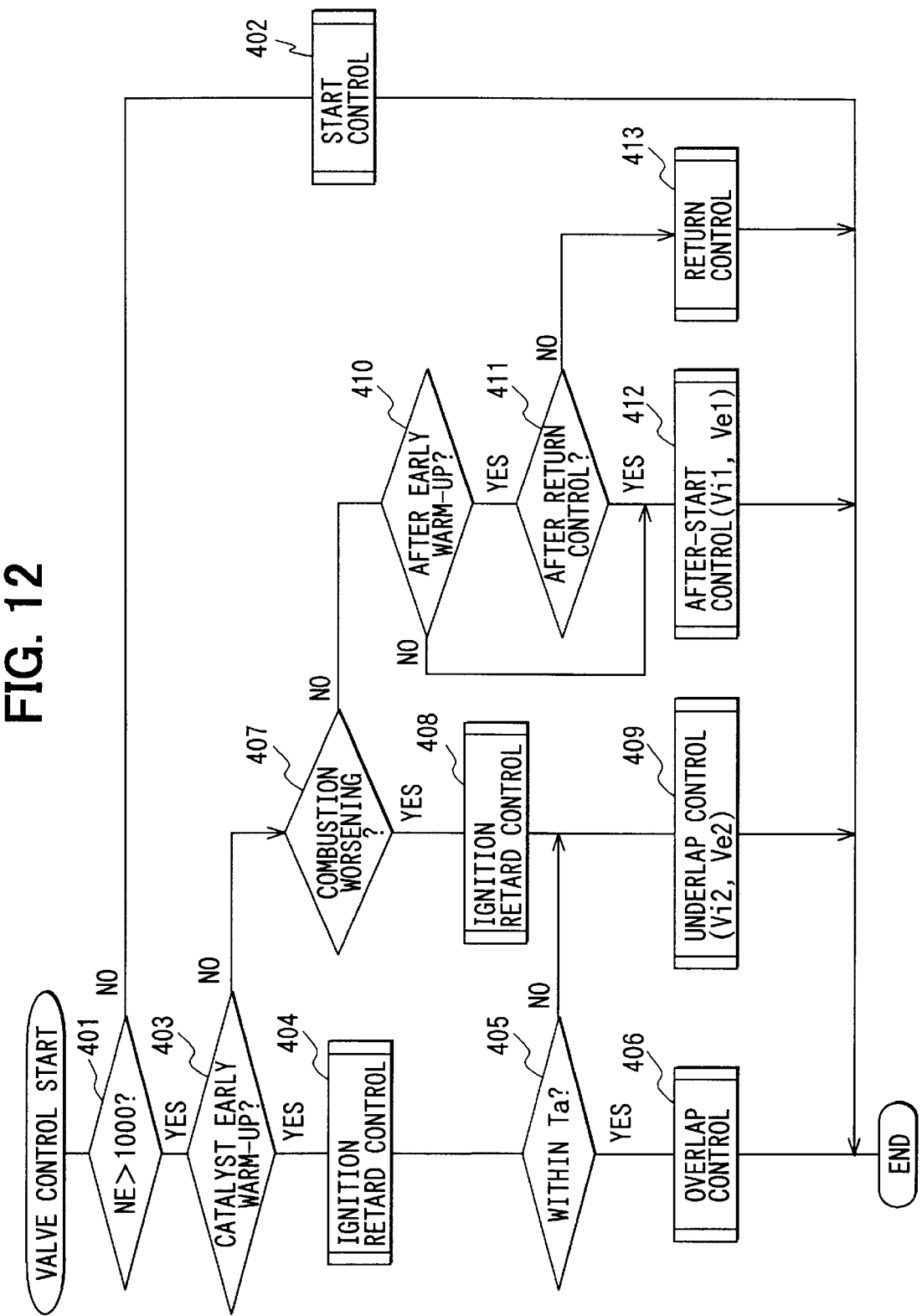
FIG. 12 is a flow diagram showing a valve control executed by a second embodiment of the present invention.

First of all, a program executed to implement control according to this embodiment is described by referring to a flow diagram shown in FIG. 12. The program starts at predetermined intervals, which are each set at a predetermined crank angle of a crankshaft the engine 1. The processing starts with step 401 to determine whether the start of the engine 1 has been completed after the engine 1 is started by the crankshaft. The start of the engine 1 is determined to have been completed typically when the engine speed NE has exceeded a predetermined speed such as 1,000 rpm or 400 rpm. If the engine speed NE has not exceeded 1,000 rpm, the routine proceeds to step 402. At step 402, as a start-time control, the closing timing of the exhaust valve 9 is set at an advance angle while the opening timing of the intake valve 8 is set at a fixed angle. In the case of this embodiment, an intake variable timing mechanism 25a is provided with an intermediate position stopper (not shown). The intermediate position stopper is used for mechanically setting the opening timing of the intake valve 8 at typically intake BTDC 5 degrees CA.

The closing timing of the exhaust valve 9 is set at an advance angle from the following reasons. It is known that the combustion gas exhausted to the exhaust passage 7 can be again supplied to the combustion chamber by opening the intake valve 8 and the exhaust valve 9 at the same time. This control is an exhaust gas recirculation (EGR) control executed for contribution to re-combustion of combustion gas, which was exhausted to the exhaust passage 7. However, the volume of combustion gas re-supplied to the combustion chamber by the EGR control is determined by a difference in gas pressure between the exhaust passage 7 and the intake passage 6.

In the operating state such as a start state of the engine 1, a high negative pressure cannot be obtained as a pressure in the intake passage 6. Thus, in the start state of the engine 1, sufficient combustion gas cannot be re-supplied to the combustion chamber. As a result, it is impossible to provide the EGR effect of supplying unburned HC included in combustion gas to the combustion chamber as contribution to re-combustion. For this reason, in the engine start state, wherein a high negative pressure cannot be obtained as a pressure in the intake passage 6, the closing timing of the exhaust valve 9 is set at an advance angle relative to the inlet TDC to shut up combustion gas in the combustion chamber in order to generate an EGR effect.

In addition, at that time, the start-time ignition timing is set at a normal ignition timing. Then, the execution of this routine ends.

If the determination result at step 401 indicates that the start of the engine 1 has been completed, on the other hand, the processing proceeds to step 403 to determine whether a condition for executing early warm-up control of the three-way catalyst 19 is satisfied or, that is, whether the engine water temperature THW is within a predetermined temperature range. The predetermined desirable temperature range is typically a range between a water temperature, which is not a very low temperature, and a warmed-state temperature of 80 degrees Celsius. The cold-state temperature is typically −10 degrees Celsius.

If the condition for executing early warm-up control of the three-way catalyst 19 is satisfied, the processing proceeds to step 404. At step 404, the ignition timing is set at a predetermined retard angle. The processing then proceeds to step 405 to determine whether the engine 1 is within a predetermined period Ta after its start. The predetermined period Ta is a period in which an after-burning occurs after the combustion is improved.

Conditions for the after-burning phenomenon to occur include an exhaust gas temperature exceeding a predetermined value of typically 800 degrees Celsius and an air-fuel ratio of at least 15 on the lean side. It should be noted that fuel injection control will be described later. If such conditions are satisfied, oxygen exists in the exhaust passage 7 at a high concentration and a high temperature. Thus, unburned HC gas included in combustion gas exhausted to the exhaust passage 7 causes an oxidation chemical reaction burning the HC gas.

If the engine 1 is within the predetermined period Ta, the processing proceeds to step 406 at which an overlap control is executed. The overlap control is for producing the EGR effect. Thus, the overlap control is the same as the EGR control. To be more specific, the overlap control sets a period in which the intake valve 8 and the exhaust valve 9 are opened at the same time to re-supply combustion gas, which was once exhausted to the exhaust passage 7, to the combustion chamber.

By re-supply combustion gas once exhausted to the exhaust passage 7 to the combustion chamber, unburned HC gas included in combustion gas exhausted to the exhaust passage 7 contributes to combustion again so that emission can be prevented from deteriorating. In particular, when the engine water temperature THW is at a value in a state of a cooling operation, the temperature inside the combustion chamber is low so that the combustion becomes unstable and a large amount of HC gas is generated. In addition, when the three-way catalyst 19 has not reached a warmed state, the rate of removal of noxious gas from exhausted gas is low so that unburned HC is inevitably exhausted to the atmosphere as it is. For this reason, the EGR effect suppresses the exhaust of unburned HC to the atmosphere and prevents emission from worsening.

Next, a method of setting the intake valve 8 and the exhaust valve 9 is described. First of all, as a target opening timing of the intake valve 8, an opening timing set at a start time is used as it is. On the other hand, by taking an overlap quantity into consideration, the closing timing of the exhaust gas 9 is set at intake ATDC 10 degrees CA. That is, since the pressure in the intake passage 6 is a negative pressure required for obtaining the EGR effect by the overlap operation, the EGR effect is utilized by setting the overlap quantity. The overlap quantity is set by setting the closing timing of the exhaust passage 9 at a retard angle.

Then, till the predetermined period Ta lapses after the start of the engine 1, the ignition timing is set at a retard angle as described above and, by taking the overlap quantity into consideration, the close timing of the exhaust valve 9 is set at a retard angle. Due to the EGR effect, the temperature of unburned HC included in exhausted gas can be lowered so that emission can be prevented from worsening.

If the predetermined period Ta has lapsed, on the other hand, an after-burning condition is satisfied. Thus, unburned HC gas included in combustion gas exhausted to the exhaust passage 7 causes an oxidation chemical reaction burning the HC gas. For this reason, the effect of the reduction of the HC-gas temperature by the EGR effect is not required. In this case, the processing proceeds to step 409 at which an underlap control is executed. A flow diagram shown in FIG. 13 represents the sub-routine of the underlap control. This sub-routine is executed each time the underlap control of step 409 is executed. In this control, the timings of the intake valve 8 and the exhaust valve 9 are set on the basis of a target underlap quantity for the following reasons.

First of all, if the predetermined period Ta lapses, causing the after-burning condition to be satisfied, it becomes necessary to set the air-fuel ratio at a value on the lean side. If the air-fuel ratio is at a value on the lean side during execution of EGR control by carrying out the overlap operation, however, the combustion inside the combustion chamber becomes unstable so that the engine speed NE unavoidably varies.

Thus, in order to stabilize the combustion, the target opening timing of the intake valve 8 is set at a retard angle relative to the intake TDC. By setting the target opening timing of the intake valve 8 at a retard angle relative to the intake TDC as such, there arises a difference in gas pressure between the intake passage 6 and the exhaust passage 7. By generating such a difference in pressure, it is possible to raise the intake flow velocity of air, which flows when the intake valve 8 is opened. Thus, atomization of fuel injected by the injector 16 is made easy and combustion is thereby improved. Therefore, even if the air-fuel ratio is set at a value on the lean side by fuel injection control to be described later, the stability of the combustion can be prevented from deteriorating.

Then, the closing timing of the exhaust valve 9 is set on the basis of a target overlap quantity. If the closing timing of the exhaust valve 9 is close to the opening timing of the intake valve 8 even if the opening timing of the intake valve 8 is set at a retard angle in order to increase the velocity of the intake flow, it is likely that the gas-tightly closed state of the exhaust valve 9 and the cylinder wall surface is not assured. Thus the difference in gas pressure between the intake passage 6 and the exhaust passage 7 is not adequately assured. In order to solve this problem, a predetermined underlap quantity is set so that the difference in gas pressure between the intake passage 6 and the exhaust passage 7 can be adequately assured.

Figure 16:
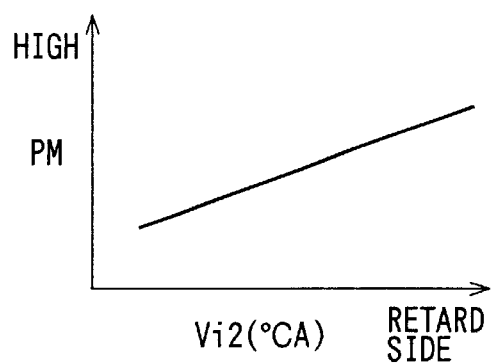
FIG. 16 is a graph showing a relation between opening timing of the intake valve and air pressure.

Next, the processing of the underlap control is described by referring to a flow diagram shown in FIG. 13. First of all, processing of step 501 is carried out. In the processing carried out at step 501, data such as the intake air pressure PM, the engine speed NE and the water temperature THW are read out from the RAM in the ECU 80 as load quantities of the engine 1. Then, at the following step 502, a target opening timing Vi2 is determined by using a map shown in FIG. 16 as an opening timing Vi of the intake valve 8. In accordance with this map, the greater the absolute value of the intake air pressure PM, the greater the retard angle at which the target opening timing Vi2 is set and, the smaller the absolute value of the intake air pressure PM, the greater the advance angle at which the target opening timing Vi2 is set. That is; in accordance with this map, the opening timing of the intake valve 8 is set at such a retard angle so that the difference in gas pressure between the intake passage 6 and the exhaust passage 7 becomes equal to typically 600 mmHg.

Then, at the next step 503, a target underlap quantity ULT is determined by carrying out processing. With regard to the target underlap quantity ULT, if the closing timing of the exhaust valve 9 is close to the opening timing of the intake valve 8, it is likely that the combustion chamber cannot be gas-tightly closed adequately as described above. Thus, the velocity of the intake flow cannot be raised sufficiently. As a result, it is quite within the bounds of possibility that the combustion inevitably worsens.

Figure 17:
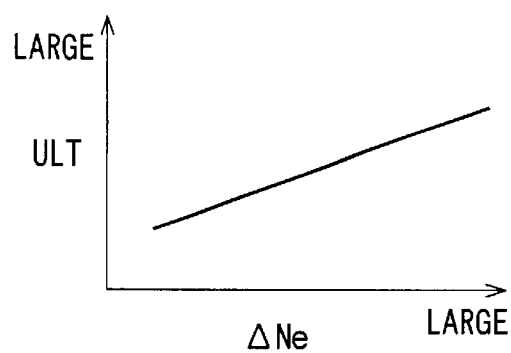
FIG. 17 is a graph showing a relation between target underlap quantity and engine speed.

For this reason, in an operation to set a target underlap quantity ULT, an engine speed change ΔNe is used as a substitute for deterioration of the combustion stability as shown in a map of FIG. 17. That is, for a large engine speed change ΔNe, the closing timing of the exhaust valve 9 is close to the opening timing of the intake valve 8 so that it is likely that the combustion chamber cannot be gas-tightly closed adequately. Therefore, since the velocity of the intake flow cannot be raised sufficiently, the combustion is determined to worsen. Thus, for a large engine speed change ΔNe, the target underlap quantity ULT is set at a large value. For a small engine speed change ΔNe, on the other hand, the combustion chamber is determined to be gas-tightly closed adequately so that the target underlap quantity ULT is set at a small value.

Figure 18:
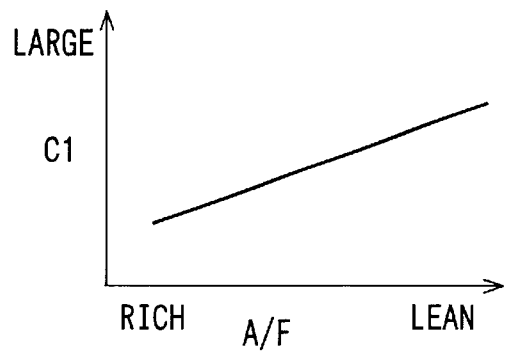
FIG. 18 is a graph showing a relation between a coefficient C1 and air-fuel ratio.

In addition, predetermined coefficient C1 can be set for an air-fuel ratio as shown in a map of FIG. 18. Coefficient C1 is a coefficient for correcting a target underlap quantity ULT set for an engine speed change ΔNe as shown in FIG. 17. In accordance with the map shown in FIG. 18, the leaner the air-fuel ratio, the greater the value at which coefficient C1 is set. On the other hand, the richer the air-fuel ratio, the smaller the value at which coefficient C1 is set. This is because, the leaner the air-fuel ratio, the less the combustion stability so that, by setting the target underlap quantity ULT at a large value, the gas-tightly closed state of the cylinder can be made better in comparison with a condition for an air-fuel ratio set at a value on a rich side.

Figure 19:
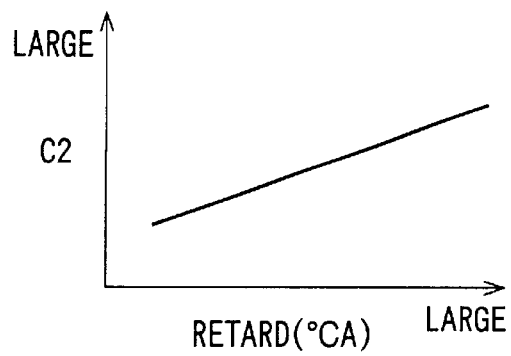
FIG. 19 is a graph showing a relation between a coefficient C2 and a retard angle.

Furthermore, a predetermined coefficient C2 can be set for a retard angle relative to the intake TDC of the intake valve 8 as shown in a map of FIG. 19. In accordance with the map shown in FIG. 19, the smaller the retard angle, the smaller the value at which coefficient C2 is set. On the other hand, the greater the retard angle, the greater the value at which coefficient C2 is set. Much like coefficient C1, coefficient C2 is a coefficient for correcting a target underlap quantity ULT set for the engine speed change ΔNe as shown in FIG. 17. Since the retard angle relative to the intake TDC is the opening timing of the intake valve 8, the greater the retard angle, the more negative the gas pressure inside the cylinder. Thus, since coefficient C2 serves as a correction coefficient required for assuring the gas-tightly closed state of the cylinder, coefficient C2 is set at a value according to the retard angle as described above.

As described above, coefficient C1 and/or coefficient C2 are each a coefficient for correcting a target underlap quantity ULT set for an engine speed change ΔNe as shown in FIG. 17. It should be noted that, in actual processing, a target underlap quantity ULT set for an engine speed change ΔNe is multiplied by these coefficients, or these coefficients are added to the target underlap quantity ULT.

Then, a target underlap quantity ULT set at step 503 is added to a target opening timing Vi2 of the intake valve 8 to obtain a target timing Ve2 used as the closing timing Ve of the exhaust valve 9. The target opening timing Vi2 of the intake valve 8 is set at step 502. Then, the execution of this routine is terminated.

The underlap control routine is called at step 409 of the flow diagram shown in FIG. 12 when the determination result at step 403 indicates that a condition for executing the early warm-up control of the three-way catalyst 19 is not satisfied and the determination result at step 407 indicates that the combustion has deteriorated or combustion stabilizing control is being executed. When the air-fuel ratio is controlled to a value in the Vicinity of a lean limit, for example, for a lean air-fuel ratio, variations in torque are large. Thus, a change in engine speed NE easily occurs.

Therefore, in order to stabilize the combustion by execution of the combustion stabilizing control, control quantities such as the fuel injection volume and the ignition timing are adjusted so as to suppress the variations in engine speed NE. That is, if the combustion has worsened or combustion stabilizing control is being executed as described above, the processing proceeds from step 407 to step 408 at which an ignition timing is set. Then, at the next step 409, the underlap control routine is called. Finally, the execution of this routine ends.

If the determination result at step 407 is NO indicating that neither the combustion has worsened nor combustion stabilizing control is being executed, on the other hand, the processing proceeds to step 410 to determine whether the early warm-up control of the three-way catalyst 19 has been executed. If the determination result at step 410 is NO indicating that the early warm-up control of the three-way catalyst 19 has not been executed, the processing proceeds to step 412 at which after-start normal control is executed. Then, the execution of this routine ends.

If the determination result is YES indicating that the early warm-up control of the three-way catalyst 19 has been executed, on the other hand, the processing proceeds to step 411 to determine whether a return control has been executed to return from the early warm-up control of the three-way catalyst 19 to the normal control. If the determination result at step 411 is YES indicating that the return control has been executed, the processing proceeds to step 412.

The after-start normal control is executed at step 412 to determine a target opening timing Vi1 of the intake valve 8 and a target closing timing Ve1 of the valve 9 by using the maps shown in FIGS. 14 and 15 respectively. First of all, a method of setting the target opening timing Vi1 of the intake valve 8 is described. A target opening timing Vi1 for parameters, that is, the air pressure PM in the intake passage 6 and the engine speed NE, is determined from a data map shown in FIG. 14. By using this map, the target opening timing Vi1 of the intake valve 8 can be set at a value suitable for an operating state. A method of setting the target closing timing Ve1 of the exhaust valve 9 is similar to the method of setting the target opening timing Vi1 of the intake valve 8. That is, a target closing timing Ve1 for the same parameters, that is, the air pressure PM in the intake passage 6 and the engine speed NE, is determined from a data map shown in FIG. 15. Thus, in the same way, by using this map, the target closing timing Ve1 of the exhaust valve 9 can be set as the closing timing Ve suitable for an operating state.

An ignition timing can be determined by adopting the commonly known method to set the ignition timing after a start of the engine 1. Specifically, in accordance with this method to set the ignition timing, the ignition timing is set at such a value that a maximum torque can be generated in the prevalent operating state and, at the same time, the conventionally-known knock control is also executed as well. In accordance with the knock control, in a region where a knock is generated, the ignition timing is set at a predetermined retard angle on the basis of generation of the knock and is to be gradually shifted to an advance angle thereafter.

If the determination result at step 411 is NO indicating that the control to return from an early warm-up state to a normal state has not been executed, on the other hand, the processing proceeds from step 411 to step 413 at which the return control is executed. This return control is executed to gradually change the ignition timing for the early warm-up operation of the three-way catalyst 19, the target opening timing Vi2 of the intake valve 8 and the target closing timing Ve2 serving as a closing timing of the exhaust valve 9 to the ignition timing set by after-start normal control, the target opening timing Vi1 of the intake valve 8 and the target closing timing Ve1 of the exhaust valve 9 respectively. Specifically, during the control to return to the after-start normal control, a predetermined value is added to or subtracted from each of the target values prevailing prior to the return control repeatedly several times to as to result in target values prevailing after the return control. Finally, the execution of this routine ends.

Figure 20A:
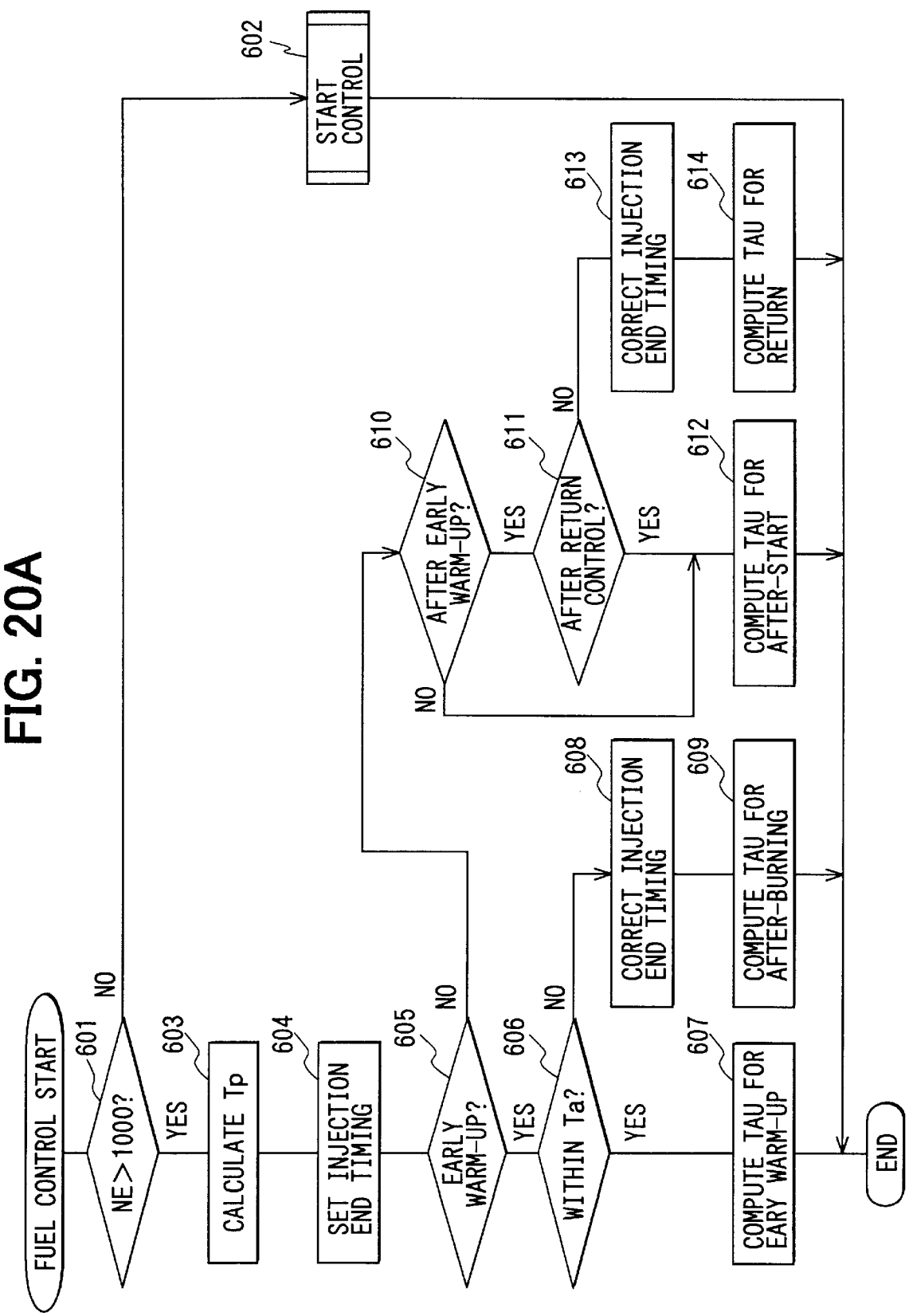
FIG. 20A is a flow diagram showing a fuel injection control executed by the second embodiment.

Next, fuel injection control of this embodiment is described by referring to a flow diagram shown in FIG. 20A. The routine shown in FIG. 20A is a program executed to carry out processing to determine a fuel injection time TAU and a fuel injection timing. The routine starts with step 601 to determine whether a start of the engine 1 has been completed. The start of the engine 1 is determined to have been completed typically when the engine speed NE has exceeded a predetermined speed such as 1,000 rpm or 400 rpm. If the start of the engine 1 has not been completed, that is, if the engine 1 is still being started, the processing proceeds to step 602. At step 602, start-time control is executed to set each of the fuel injection time TAU and the fuel injection timing at a fixed value by taking a start-time start characteristic into consideration. Then, the execution of this routine ends.

If the determination result at step 601 is YES indicating that the start of the engine 1 has been completed, on the other hand, the processing proceeds to step 603. At step 603, a basic fuel injection time Tp appropriate for the operating state is determined from typically a data map. More specifically, the basic fuel injection time Tp is computed from the intake air volume Q and the engine speed NE. Then, the processing proceeds to step 604. At step 604, a fuel injection end timing also appropriate for the intake air volume Q and the engine speed NE is determined from typically a data map.

Then, the processing proceeds to step 605 to determine whether the three-way catalyst 19 is being subjected to the early warm-up control. If the result of determination indicates that the early warm-up control of the three-way catalyst 19 is being executed, the processing proceeds to step 606 to determine whether the engine 1 is within the predetermined period Ta after its start.

If the engine 1 is within the predetermined period Ta after its start, the processing proceeds to step 607 at which the fuel injection time TAU for use during execution of the early warm-up control of the three-way catalyst 19 is determined. Specifically, the fuel injection time TAU is computed by multiplication of the basic fuel injection time Tp determined at step 603 by a correction coefficient representing an operating-state quantity such as the engine water temperature THW. Since the fuel injection end timing and the fuel injection time TAU have been determined, at the same time, the fuel injection start timing can be determined eventually. In this way, the control of injection can be executed.

If the predetermined period Ta has lapsed since the engine start determined at step 601, on the other hand, the processing proceeds to step 608. At step 608, the fuel injection end timing is set. Specifically, the fuel injection end timing set at step 604 is corrected in accordance with the target opening timing of the intake valve 8. The fuel injection end timing needs to be changed because the predetermined period Ta has lapsed after the start, that is, because the after-burning condition is satisfied. Thus, since the target opening timing of the intake valve 8 is set at the retard angle, the difference in gas pressure is generated between the combustion chamber and the intake passage 6. As a result, the velocity of the intake flow increases to a value higher than a velocity for a normal opening timing of the intake valve 8. Then, the processing proceeds to step 609.

At step 609, the fuel injection time TAU to be applied after the after-burning condition is satisfied is determined. Specifically, the fuel injection time TAU is computed by multiplication of the basic fuel injection time Tp determined at step 603 by a correction coefficient representing an operating-state quantity such as the engine water temperature THW. The fuel injection time TAU is further multiplied by a leaner-value correction coefficient to reduce the fuel injection time TAU so that the air-fuel ratio is shifted to the lean side. Then, the execution of this routine ends.

As described above, after the predetermined period Ta lapses, the control is executed to set the fuel injection time TAU at a value smaller than that for a fuel injection time at a normal state so that the air-fuel ratio is shifted to the lean side and, the fuel injection start timing is set on the basis of the opening timing of the intake valve 8 so that atomization of fuel injected by the injector is made easy. As a result, the combustion is stabilized. In addition, in an operating state wherein the exhausted gas temperature is higher than a predetermined value of 800 degrees Celsius and the air-fuel ratio is on the lean side, unburned HC gas component exhausted by combustion to the exhaust passage 7 is eliminated by an oxidation chemical reaction. As a result, emission can be prevented from deteriorating without execution of the EGR control (or the overlap control).

If the determination result at step 605 is NO indicating that the early warm-up control of the three-way catalyst 19 is not being executed, on the other hand, the processing proceeds to step 610 to determine whether the early warm-up control of the three-way catalyst 19 has been completed. If the determination result at step 610 is NO indicating that the early warm-up control of the three-way catalyst 19 has not been completed, the processing proceeds to step 612 at which the fuel injection time TAU for a normal state after the start of the engine 1 is determined. Then, the execution of this routine ends. The fuel injection time TAU for the normal state after the start of the engine 1 is determined by multiplication of the basic fuel injection time Tp determined at step 603 by the correction coefficient representing an operating-state quantity such as the engine water temperature THW.

If the determination result at step 610 is YES indicating that the early warm-up control of the three-way catalyst 19 has been completed, on the other hand, the processing proceeds to step 611 to determine whether return control has been completed. The return control is the same as the return control of step 411 of the flow diagram shown in FIG. 12. If the return control has been completed, the processing proceeds to step 612 at which a fuel injection time TAU for a normal state after the start of the engine 1 is determined. Then, the execution of this routine ends.

If the determination result at step 611 is NO indicating that the return control has not been completed, on the other hand, the processing proceeds to step 613. At step 613, the fuel injection timing is gradually changed to a fuel injection timing for the normal state after the start of the engine 1 in accordance with the target opening timing of the intake valve 8. The target opening timing of the intake valve 8 was set during the return control executed in the processing represented by the flow diagram shown in FIG. 12. The processing then proceeds to step 614.

At step 614, the fuel injection time TAU to be applied during the return process is determined by carrying out processing. In this processing, the fuel injection time TAU is gradually changed from the fuel injection time TAU at the return air-fuel ratio set at step 609 to the fuel injection time TAU for the normal state after the start of the engine 1. Then, the execution of this routine ends.

Figure 20B:
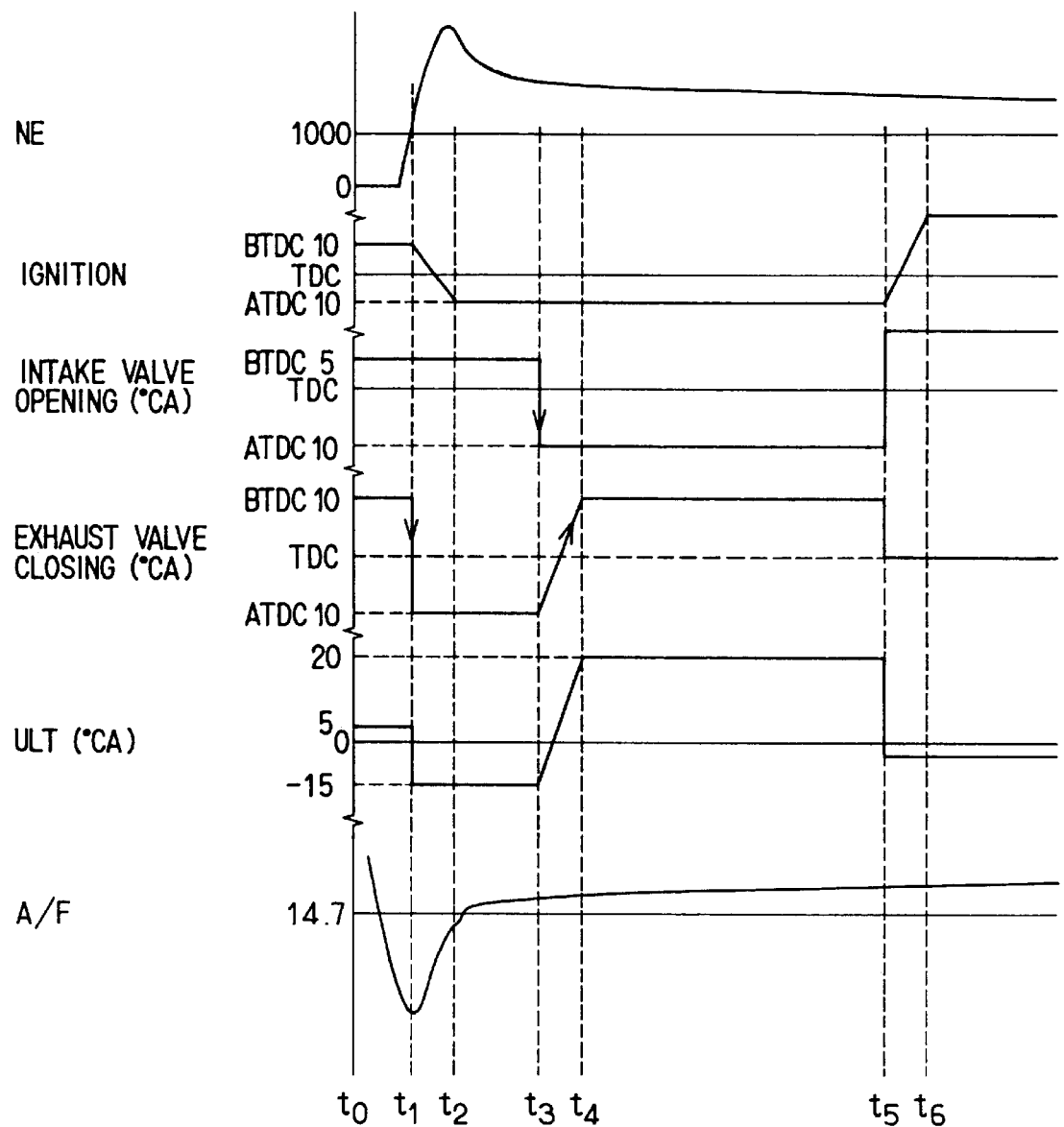
FIG. 20B is a timing diagram showing control operations of the second embodiment.

The following description explains the target opening timing of the intake valve 8 as well as the target closing timing of the exhaust valve 9, which are controlled as described above, the control of the ignition timing and the control of fuel injection by referring to timing diagram shown in FIG. 20B.

First, when cranking is started by a driver at time t0, the engine speed NE increases due to a first explosion of mixed air in the engine. At that time, the ignition timing and the opening timing Vi of the intake valve 8 are each set at the fixed value, which takes the start characteristic into consideration. In the mean time, the exhaust valve 9 reduces the quantity of an unburned HC gas component due to an EGR effect. Since the difference in gas pressure between the intake passage 6 and the exhaust passage 7 is small, however, it is difficult to re-supply combustion gas to the combustion chamber even if the overlap quantity is set.

In order to solve this problem, the closing timing Ve of the exhaust valve 9 is set at an advance angle relative to the intake TDC at the start of the engine 1 in order to shut up combustion gas in the combustion chamber so as to take advantage of the EGR effect. It should be noted that the closing timing Te of the exhaust valve 9 is set an advance angle determined by the opening timing Vi of the intake valve 8 and the target underlap quantity ULT.

Then, when the engine speed NE reaches 1,000 rpm at time t1, the start of the engine 1 is determined to have been completed. If the start of the engine 1 is determined to have been completed and the engine water temperature THW is within the predetermined temperature range, a condition for executing the early warm-up control of the three-way catalyst 19 is considered to be satisfied.

If a condition for executing the early warm-up control of the three-way catalyst 19 is considered to be satisfied at time t1, the ignition timing θ ig is set at ATDC 10 degrees CA, a retard angle relative to the intake TDC. With the ignition timing θ ig set at a retard angle, the combustion progresses slowly, resulting in a peak smaller than a peak at the normal combustion temperature. Even if the exhaust valve 9 is opened, however, it is possible to sustain a combustion temperature higher than the normal combustion temperature so that the temperature of gas exhausted through the exhaust passage 7 can be increased.

The opening timing Vi of the intake valve is set at the fixed value of the start time. By setting an overlap quantity through adjustment of the closing timing Ve of the exhaust valve 9, however, combustion gas can be re-supplied to the combustion chamber. This is because the gas pressure in the intake passage 6 has reached a predetermined negative level after the time t1. For this reason, the closing timing Te of the exhaust valve 9 is set at a retard angle relative to the opening timing Vi of the intake valve 8. Specifically, the retard angle of the closing timing Te of the exhaust valve 9 sets the target underlap quantity ULT at −15 degrees CA, which is equivalent to an overlap quantity of 15 degrees CA, to exhibit the EGR effect.

At time t3 upon lapse of the predetermined period Ta after the start of the engine 1, the temperature of combustion gas in the exhaust passage 7 reaches about 800 degrees Celsius. Thus, control is executed to correct the fuel injection volume to a smaller value to shift the air-fuel ratio to the lean side. Thus, since unburned HC gas in the exhaust passage 7 is oxidized by oxygen in the exhaust passage 7 in the chemical reaction, the EGR control is not required. For this reason, in order to stabilize combustion during a period between the time t3 and time t4, the opening timing Vi of the intake valve 8 is set at a retard angle relative to the intake TDC.

By setting the opening timing Vi of the intake valve 8 at such an angle, the intake valve 8 is closed while the piston is moving from the TDC in the downward direction after the engine 1 enters the intake stroke. Thus, the gas pressure in the combustion chamber becomes more negative. Therefore, when the intake valve 8 is opened, a difference in pressure is generated between the intake passage 6 and the combustion chamber. In this embodiment, the fuel injection timing is set at a high velocity of the intake flow in accordance with the opening timing of the intake valve 8. Thus, the atomization of fuel injected by the injector is facilitated, making it possible to stabilize the combustion.

At that time, the closing timing Ve of the exhaust valve 9 is set on the basis of the opening timing Vi of the intake valve 8 and the target underlap quantity ULT. By setting the opening timing Vi of the intake valve 8 at a retard angle relative to the intake TDC, the gas pressure in the combustion chamber becomes more negative. If the closing timing Ve of the exhaust valve 9 is close to the opening timing Vi of the intake valve 8, however, the gas-tight closure of the combustion chamber cannot be sustained so that a large negative gas pressure cannot be generated inside the combustion chamber. For this reason, the target underlap quantity ULT is set at a predetermined crank angle of 20 degrees CA and, the closing timing Ve of the exhaust valve 8 is set at a value based on the set value of the target underlap quantity. Thus, the combustion chamber can be gas-tightly closed and a high velocity of the intake flow can be sustained. As a result, the stability of the combustion can be prevented from worsening.

When the early warm-up control of the three-way catalyst 19 is completed at time t5, the ignition timing θ ig is gradually restored to the normal ignition timing by time t6. It should be noted that, at time t5, the opening timing Vi of the intake valve 8 and the closing timing Ve of the exhaust valve 9 can also be restored to values for normal control gradually as shown in FIG. 20B or restored to the normal values for the normal control through the return control.

In addition, the fuel injection control of this embodiment can also be executed by gradually shifting the air-fuel ratio from a value at the end of the start to a value on the lean side as shown by a curve A/F in FIG. 20B and by adjusting the air-fuel ratio to the stoichiometric air-fuel ratio upon completion of the early warm-up control of the three-way catalyst 19 at time t5.

In this embodiment, an intake-based control means is implemented by the processing carried out at step 503 of the flow diagram shown in FIG. 13.

In the first and second embodiments, when a semi-warmed state of the internal combustion engine 1 is detected at the start of the engine 1, the opening timing Vi of the intake valve 8 can be set at a retard angle relative to the intake TDC at the start of the internal combustion engine 1.

In addition, the semi-warmed state of the internal combustion engine 1 can be detected when the three-way catalyst 19 is not warmed and the internal combustion engine 1 is almost warmed. Specifically, the semi-warmed state of the internal combustion engine 1 may be detected on the basis of at least one of the engine water temperature THW, the lapse of time since the start of the engine 1, the intake air temperature THA and the integrated value of engine speed NE.

Third Embodiment

Figure 21:
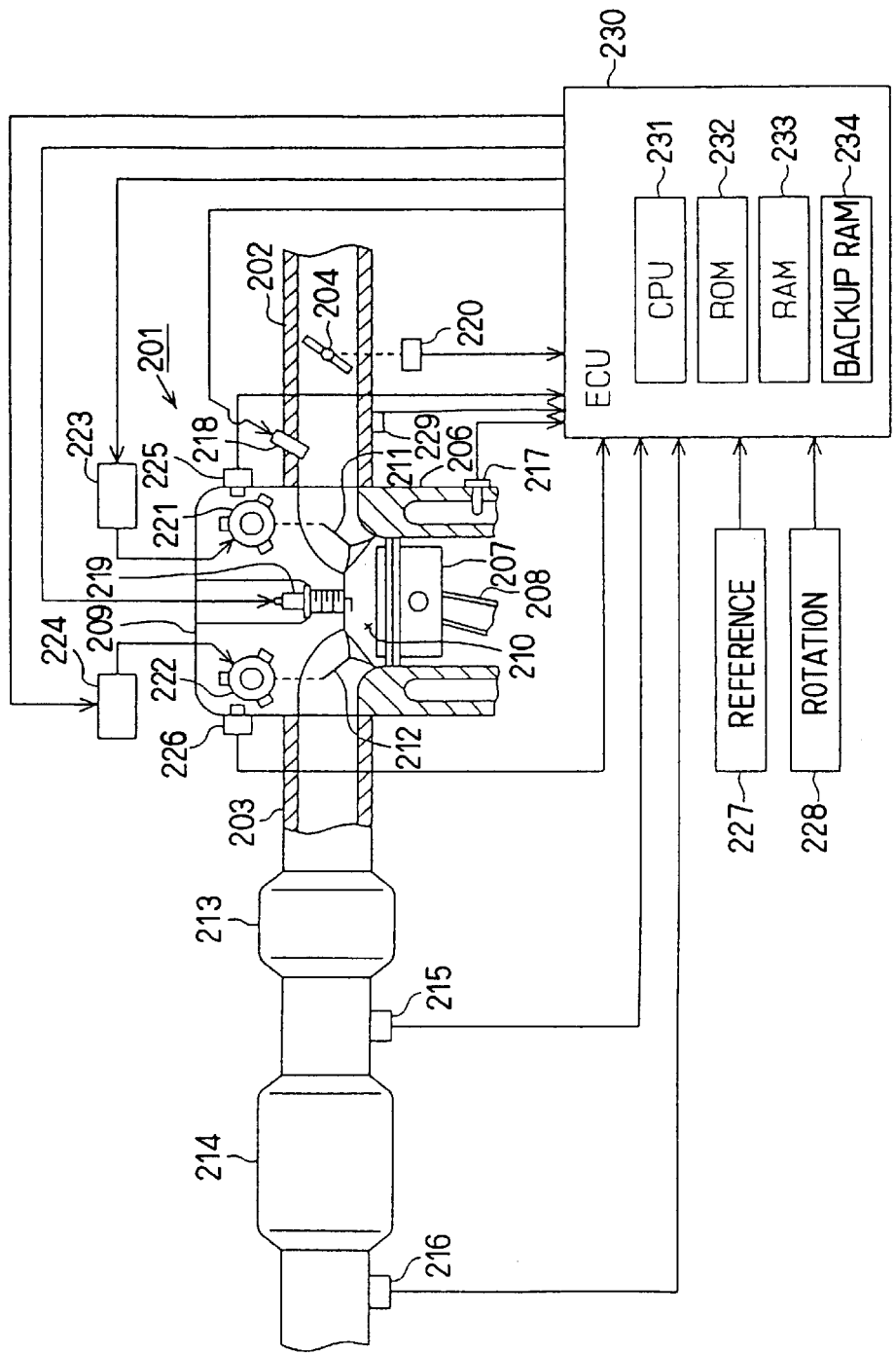
FIG. 21 is a schematic diagram showing a third embodiment of the present invention.

In this embodiment, as shown in FIG. 21, an engine 201 has an intake port and an exhaust port connected to an intake passage 202 and an exhaust passage 203, respectively. On the intake passage 202, a throttle valve 204 is linked with an accelerator pedal and an intake air pressure sensor 229 is provided for detecting the pressure of intake air. The opening of the throttle valve 204 is detected by a throttle sensor 220, which is also used for detecting a fully-closed state of the throttle valve 204.

In a cylinder 206 of the engine 201, there is provided a piston 207 moving back and forth in the vertical direction in the cylinder 206. The piston 207 is connected to a crankshaft (not shown) by a connecting rod 208. Enclosed by the cylinder 206 and a cylinder head 209, a combustion chamber 210 is formed above the piston 207. The combustion chamber 210 is connected to the intake passage 202 and the exhaust passage 203 through an intake valve 211 and an exhaust valve 212, respectively. For detecting the temperature of engine-water, a water temperature sensor 217 is provided on the cylinder 206.

On the exhaust passage 203, two catalyst converters 213 and 214 are installed. The catalyst converter 213 and the catalyst converter 214 are each a three-way catalyst used for removing three components, HC, CO and NOx, from exhausted gas. In comparison with the catalyst converter 214 provided on the downstream side, the catalyst converter 213 provided on the upstream side has a small capacity to function as a start catalyst, which can be warmed up relatively fast right after a start of the engine 201. It should be noted that the catalyst converter 213 is provided on the upstream side at a location separated from the exhaust port of the engine 201 by a distance of about 300 mm.

Used as an air-fuel ratio sensor of a limit-current type, an A/F sensor 215 is installed on the upstream side of the catalyst converter 214. The A/F sensor 215 outputs an air-fuel ratio signal, which is proportional to the concentration of oxygen included in exhausted gas and linear over a wide range. The air-fuel ratio signal may also be proportional to the concentration of carbon monoxide included in the exhausted gas. On the downstream side of the catalyst converter 214, on the other hand, there is provided an O2 sensor 216 for outputting a voltage signal for a rich side separated from a lean side by a stoichiometric ratio and a lean-side voltage signal different from the voltage signal for the rich side.

A fuel supply system (not shown) supplies high pressure fuel to an injector 218 of an electromagnetic-driven type. The injector 218 injects fuel to the intake port of the engine 201. The injector 218 is provided for each branch pipe of an intake manifold. An ignition plug 219 provided on the cylinder head 209 is driven by an ignition high voltage supplied from an igniter (not shown).

In the engine 201, fresh air flowing from the upstream side of the intake passage 202 is mixed with fuel injected by the injector 218. The mixed air-fuel gas flows into the combustion chamber 210 when the intake valve 211 is opened. The fuel flowing into the combustion chamber 210 is ignited by an ignition spark generated by the ignition plug 219.

An intake-side camshaft 221 is provided for opening and closing the intake valve 211 at a predetermined timing (crankshaft position). An exhaust-side camshaft 222 is provided for opening and closing the exhaust valve 212 at a predetermined timing. The intake-side camshaft 221 and the exhaust-side camshaft 222 are linked to as well as driven by the crankshaft through a timing belt (not shown). On the intake-side camshaft 221, an intake-side variable valve timing mechanism 223 of an oil-pressure driven type is provided. On the exhaust-side camshaft 222, an exhaust-side variable valve timing mechanism 224 of an oil-pressure driven type is provided.

The intake-side variable valve timing mechanism 223 is provided as a phase adjusting variable valve timing mechanism for adjusting a rotational phase of the intake-side camshaft 221 relative to the crankshaft. The exhaust-side variable valve timing mechanism 224 is provided as a phase-adjusting variable valve timing mechanism for adjusting a rotational phase of the exhaust-side camshaft 222 relative to the crankshaft. The operations of the intake-side variable valve timing mechanism 223 and the exhaust-side variable valve timing mechanism 224 are each adjusted in accordance with oil pressure control executed by a solenoid valve (not shown).

Specifically, the intake-side camshaft 221 rotates with a retard angle or an advance angle relative to the crankshaft in accordance with a control quantity applied to the intake-side variable valve timing mechanism 223, and the opening and closing timings of the intake valve 211 are shifted to the retard side or advance side in accordance with the operation.

The exhaust-side camshaft 222 rotates on the retard angle or advance angle side relative to the crankshaft in accordance with a control quantity applied to the exhaust-side variable valve timing mechanism 224, and the opening and closing timings of the exhaust valve 212 are shifted to the retard angle or advance angle side in accordance with the operation.

On the intake-side camshaft 221, an intake-side camshaft position sensor 225 is provided for detecting the rotational position of the intake-side camshaft 221. On the exhaust-side camshaft 222, an exhaust-side camshaft position sensor 226 is used for detecting the rotational position of the exhaust-side camshaft 222.

An electronic control unit (ECU) 230 is constructed with a microcomputer comprising components such as a CPU 231, a ROM 232, a RAM 233 and a backup RAM 234. The ECU 230 receives detection signals generated by an intake air pressure sensor 229, the A/F sensor 215, the O2 sensor 216, the water temperature sensor 217, the throttle sensor 220, the camshaft position sensors 225 and 226 to detect the engine operating state represented by an intake air volume Qa, an air-fuel ratio A/F downstream the catalyst converters 213 and 214, an engine water temperature Tw, a throttle opening and camshaft positions from the detection signals.

In addition, the ECU 230 is also connected to a reference position sensor 227 for generating pulses at intervals of 720 degrees CA and a rotational angle sensor 228 for generating pulses at shorter intervals of typically 30 degrees CA. The ECU 230 receives the pulse signals generated by the reference position sensor 227 and the rotational angle sensor 228 in order to detect a reference crankshaft position (G signal) and the engine speed NE.

On the basis of the detected engine operating, the ECU 230 executes control of fuel injection carried out by the injector 218, control of an ignition timing of the ignition plug 219, control of the opening and closing timings of the intake valve 211 which are set by the intake-side variable valve timing mechanism 223 and control of the opening and closing timings of the exhaust valve 212 which are set by the exhaust-side variable valve timing mechanism 224.

Figure 22:
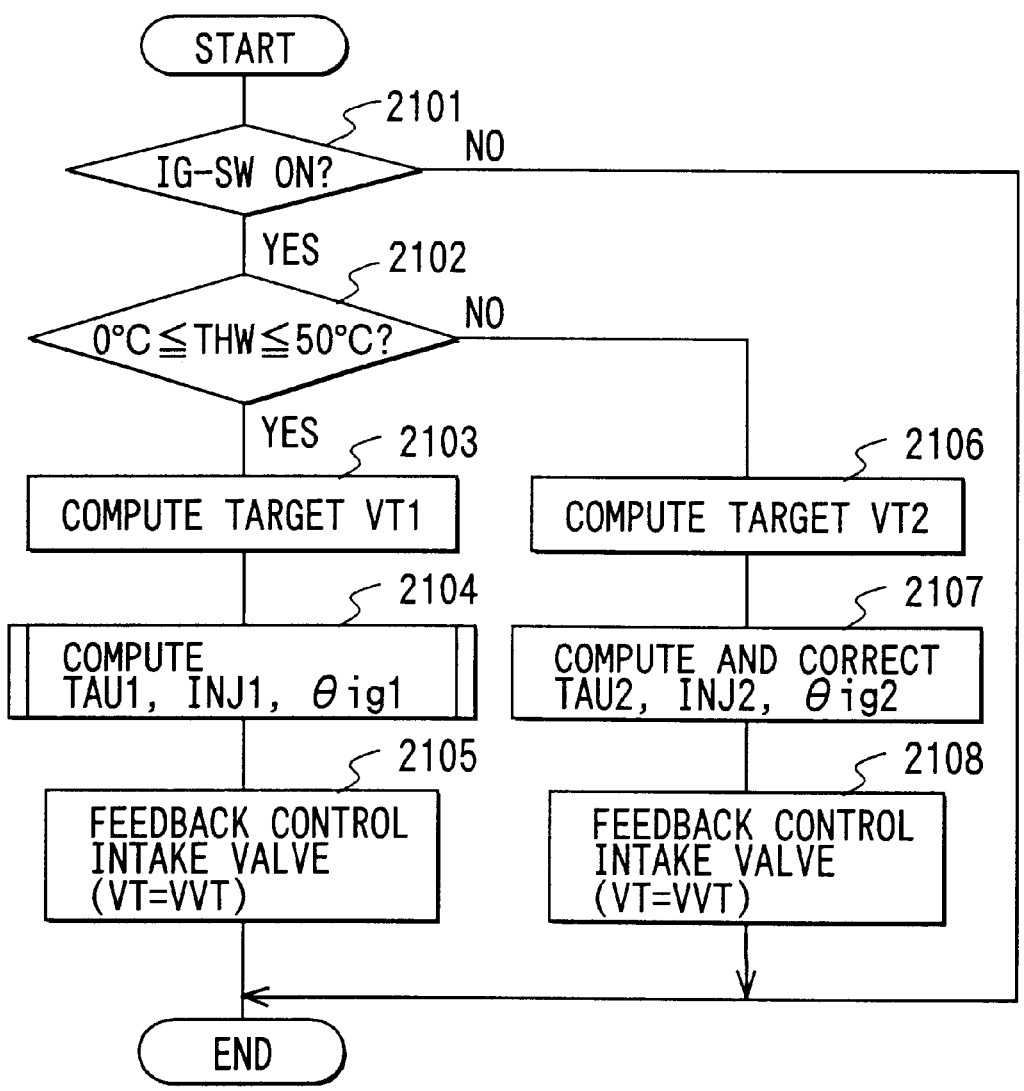
FIG. 22 is a flow diagram showing main control of the third embodiment.

The ECU 230 is programmed to execute various routines as follows. A main routine is shown in FIG. 22. The processing starts with step 2101 to determine whether the ignition switch IG-SW has been turned on. If the IG-SW has not been turned on, the execution of the routine ends. If the determination result at step 2101 indicates that the IG-SW has been turned on, on the other hand, the processing proceeds to step 2102 to determine whether the water temperature THW of the internal combustion engine 201 is in a predetermined temperature range. The temperature range from 0 degrees Celsius to 50 degrees Celsius is desirable. If the water temperature of the internal combustion engine 201 is higher than 50 degrees Celsius, the evaporation characteristic of the fuel no longer depends on the temperature. In this case, normal control is executed. It should be noted that the upper limit of the temperature range does not have to be 50 degrees Celsius. Instead, the temperature range can be determined in accordance with the evaporation characteristic of fuel stuck on the inner wall of the intake passage 202. In addition, the volatility of fuel can be taken into consideration in determination of the temperature range.

If the water temperature of the internal combustion engine 201 is beyond the predetermined temperature range, processing of steps S2106 to S2108 are carried out for normal control. Specifically, at step 2106, a target opening timing VT2 of the intake valve 211 suitable for the operating state is computed. After the target opening timing VT2 is computed at step 2106, the processing proceeds to step 2107. At step 2107, control quantities such as a fuel injection period TAU2, a fuel injection timing INJ2 and an ignition timing θ ig2 are computed for the current load of the engine 201 by adoption of conventional methods. The load of the engine 201 may be represented by the intake passage pressure PM of the engine 201 and the engine speed NE. First of all, basic control quantities are determined for the load. Then, the basic control quantities are corrected in accordance with other loads, the operating condition and the opening and closing timings of the intake valve 211 and the like to give final control quantities. Finally, at step 2108, feedback control is executed to make the opening timing of the intake valve 211 coincide with the target opening timing before the execution of this routine ends. As the feedback control, the conventional PID control or modern control can be executed.

If the determination result at step 2102 indicates that the water temperature of the internal combustion engine 201 is within the predetermined temperature range, on the other hand, the processing proceeds to step 2103 at which a target opening timing VT1 of the intake valve 211 for the temperature of the water is set. The target opening timing VT1 of the intake valve 211 is set at a value that will increase the flow velocity of the intake-air at the cold time.

More specifically, with the opening timing set at an angle retard from the normal opening position, a difference in pressure is generated between the gas inside the combustion chamber 210 of the cylinder and the air in the intake passage 202 even if the piston 7 moves down below the TDC (top dead center) due to the fact that the intake valve 211 remains closed as it is. Since the greater the retard angle of the opening of the intake valve 211, the greater the difference in pressure, intake air flows in at a high flow velocity when the intake valve 211 is opened. It is assumed that the opening timing of the intake valve 211 coincides with a timing with which a pressure difference of about 30 KPa is generated. In his case, intake air flows in at a very high flow velocity, making it possible to evaporate fuel stuck on the inner wall of the intake passage 202 with a high degree of efficiency. In addition, factors such as combustion stability can also be taken into consideration in setting the opening timing of the intake valve 211. It should be noted, however, that factors taken into consideration in setting the opening timing of the intake valve 211 are not limited to the combustion stability.

After the target opening timing VT1 is set as described above, the processing proceeds to step 2104 at which a fuel injection period TAU1, a fuel injection timing INJ1 and an ignition timing θ ig1 are computed. Details of the processing carried out at step 2104 will be described later. After the fuel injection period TAU1, the fuel injection timing INJ1 and the ignition timing θ ig1 are computed, the processing proceeds to step 2105 at which feedback control is executed to make the opening timing of the intake valve 211 coincide with the target opening timing before the execution of this routine ends.

Figure 23:
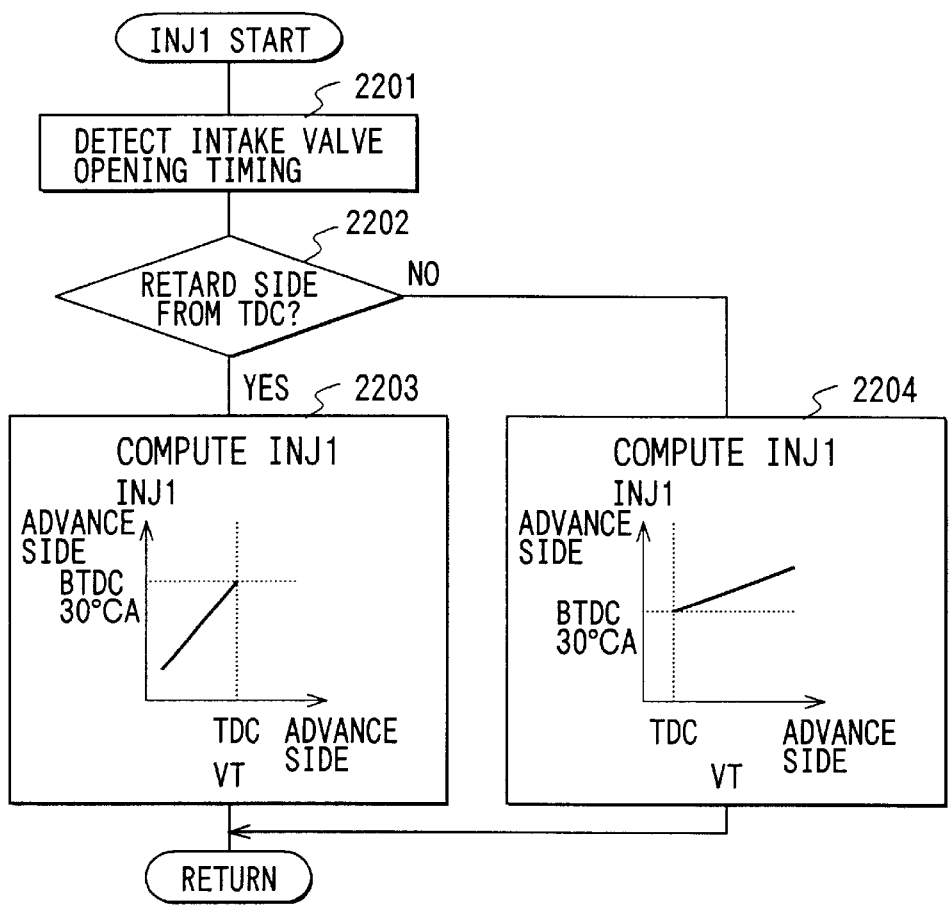
FIG. 23 is a flow diagram showing processing carried out by the third embodiment to determine a fuel injection timing.

FIG. 23 is a flow diagram showing a process of computing a fuel injection timing (fuel injection start timing) INJ based on the opening timing of the intake valve 211. The flow diagram shown in FIG. 23 represents one of various kinds of processing carried out by the ECU 230 at intervals of 30 degrees CA synchronously with crankshaft rotation.

The flow diagram shown in FIG. 23 starts with step 2201 at which an opening timing of the intake valve 211 is detected. Then, the processing proceeds to step 2202 to determine whether the opening timing VT of the intake valve 211 is on the advance angle side or a retard angle side relative to the TDC. If the opening timing of the intake valve 211 is on the retard angle side relative to the TDC, the processing proceeds to step 2203. At step 2203, the fuel injection timing is determined in correspondence with the opening timing of the intake valve 211 from a data map.

It should be noted that, if the opening timing of the intake valve 211 is on the retard angle side relative to the TDC, the flow velocity of the intake air is in a state in which an opening start of the intake valve 211 is most raised. The fuel injection timing INJ is set at such a value that fuel arrives at a location close to the intake valve 211 with the opening timing of the intake valve 211. With this taken into consideration, in accordance with the map used at step 2203, the fuel injection timing is set at a BTDC of 30 degrees CA when the opening timing of the intake valve 211 coincides with the TDC so that, with the opening timing of the intake valve 211 set at a retard angle, the fuel injection timing is also set at a retard angle in accordance with the opening timing of the intake valve 11. As described above, when the opening timing of the intake valve 211 is set at an angle retarded from the TDC, the flow velocity of the intake air increases. Thus, if fuel arrives in the vicinity of the combustion chamber 210 with this timing, the fuel is agitated well in the combustion chamber 210. As a result, stable combustion can be carried out even if the combustion is done in a lean air-fuel ratio area.

If the opening timing of the intake valve 211 is on the advance angle side relative to the TDC, on the other hand, the processing proceeds to step 2204 at which a fuel injection timing corresponding to the opening timing of the intake valve 211 is determined from a different map. Then, the execution of the routine is ended. In accordance with the map, when the opening timing of the intake valve 211 coincides with the TDC, the fuel injection timing is set at an angle slightly advanced ahead of the TDC so that the opening timing of the intake valve 211 is at an advance angle relative to the TDC. In this way, the fuel injection timing is also set at an advance angle.

Figure 24:
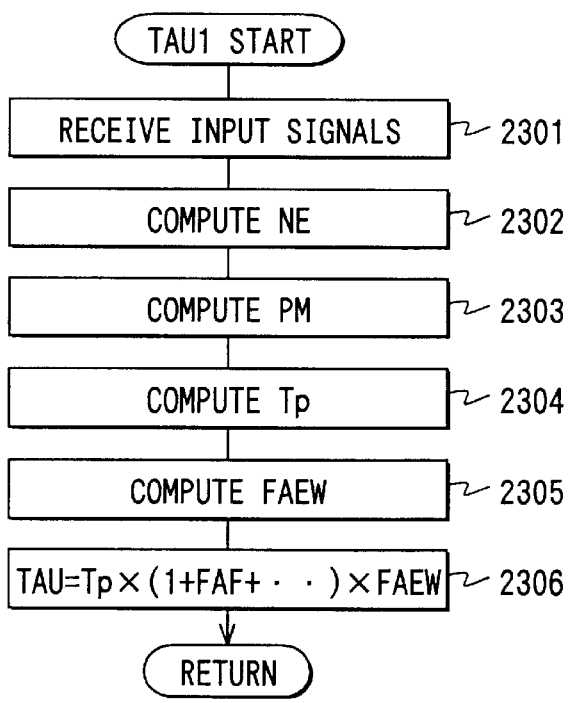
FIG. 24 is a flow diagram showing processing carried out by the third embodiment to compute a fuel injection period.

FIG. 24 is a flow diagram showing a process of computing a fuel injection period TAU1 for a fuel injection timing and an opening timing of the intake valve 211, which are set as described above. The flow diagram shown in FIG. 24 represents one of various kinds of processing carried out by the ECU 230 at intervals of 30 degrees CA synchronously with crankshaft rotation an interrupt routine for executing control of fuel injection during the operation of the internal combustion engine 201.

This processing starts with step 2301 at which input signals are received from external sources such as the intake air pressure sensor 229, the water temperature sensor 217 and the crankshaft angle sensor. The processing then proceeds to step 2302 at which the engine speed NE is computed from the input signal received from the crankshaft angle sensor. This input signal represents the number of pulses per unit time. Then, the processing proceeds to step 2303 at which the intake passage pressure PM is computed as one of the operating states of the internal combustion engine 201 from the input signal received from the intake-side variable valve timing mechanism 223. The processing then proceeds to step 2304 at which a basic fuel injection period Tp is computed from the engine speed NE calculated at step 2302 and the intake passage pressure PM calculated at step 2303 as follows:

$$Tp = f(NE, PM) \quad (1)$$

Then, the processing proceeds to step 2305 at which a transient correction coefficient FAEW described later is computed. The processing then proceeds to step 2306 at which the final fuel injection period TAU is computed from data including the transient correction coefficient FAEW calculated at step 2305, an air-fuel ratio feedback correction coefficient FAF and a correction coefficient calculated separately by another routine as follows:

$$TAU1 = TP \times (1 + FAF + \cdots) \times FAEW \quad (2)$$

Then, the processing proceeds to step 2307 at which the injector 218 of a specific cylinder identified by the input signal is controlled and driven to inject a calculated fuel injection volume. Then, the execution of this routine ends.

Figure 25:
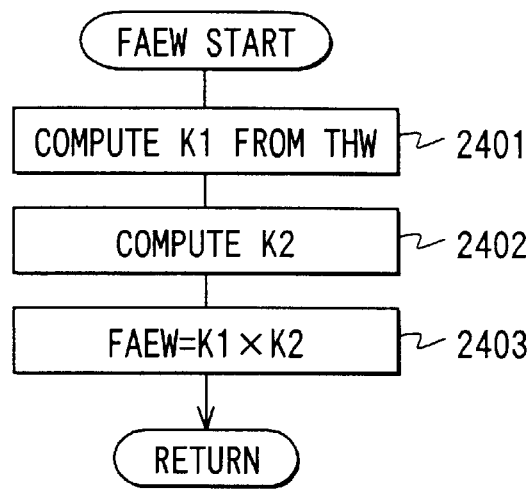
FIG. 25 is a flow diagram showing processing carried out by the third embodiment to determine a correction coefficient FAEW.

FIG. 25 is a flow diagram showing the procedure of processing carried out at step 2305 of the flow diagram shown in FIG. 24 to compute the transient correction coefficient FAEW. Like the above routine of the fuel injection control, this routine is also executed at intervals of 30 degrees CA as an interrupt routine synchronous to the crankshaft rotation.

The routine shown in FIG. 25 starts with step 2401 at which a warming-up fuel increase coefficient K1 is computed from a data map based on the water temperature THW detected by the water temperature sensor 217. In the cold start of the internal combustion engine 201, the temperature of the engine 201 is low. A warming-up fuel increase quantity is corrected by considering factors such as the amount of fuel stuck on the inner wall of the intake passage 202 and the friction against the up-down movement of the piston so that a spark ignition is not missed. The warming-up fuel increase coefficient K1 is used for correcting a conventional after-start warming-up fuel increase quantity.

Figure 26:
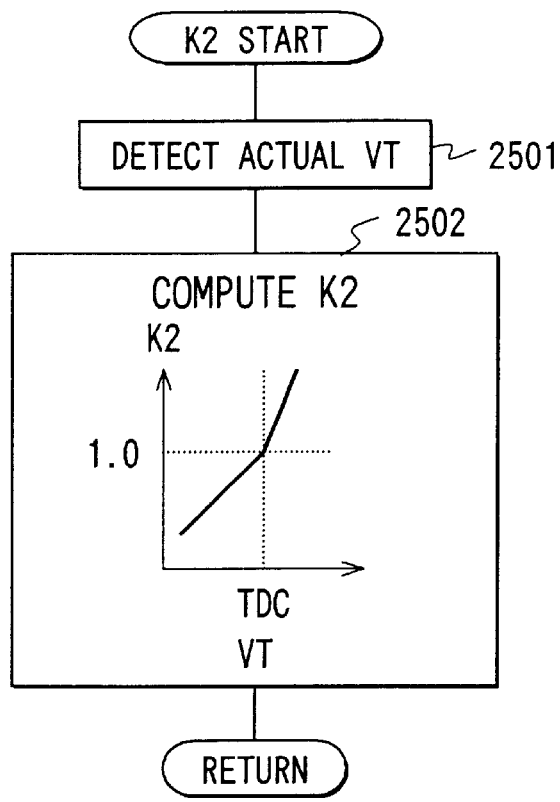
FIG. 26 is a flow diagram showing processing carried out by the third embodiment to determine a correction coefficient K2.

Then, at the next step 2402, a correction coefficient K2 is set. The correction coefficient K2 is set by the processing represented by the flow diagram shown in FIG. 26. In the processing represented by this flow diagram, the correction coefficient K2 is set for a fuel injection timing. The flow diagram shown in FIG. 26 starts with step 2501 at which an actual opening timing VT is detected. Then, the processing proceeds to step 2502. At step 2502, the correction coefficient K2 for correcting the fuel injection period TAU1 is determined from a data map based on the detected actual opening timing VT.

In accordance with this data map, for the actual opening timing of the intake valve 211 set at an angle retard from the TDC, the fuel injection period TAU1 is corrected to a smaller value whereas an actual opening timing coinciding with the TDC is not corrected. The fuel injection period TAU1 is corrected in this way because, the greater the retard angle at which the opening timing of the intake valve 211 is set, the more the flow velocity of the intake-air is increased by a difference in pressure between the intake passage 202 and the combustion chamber 210. If the flow velocity of the intake-air is increased, the amount of fuel stuck on the inner wall of the intake passage is decreased, making it possible to execute air-fuel ratio control with a high degree of precision. For an actual opening timing of the intake valve 211 set at an angle advance ahead of the TDC, on the other hand, the correction coefficient K2 is set at such a value that the fuel injection period TAU1 is corrected to a greater value.

Figure 27:
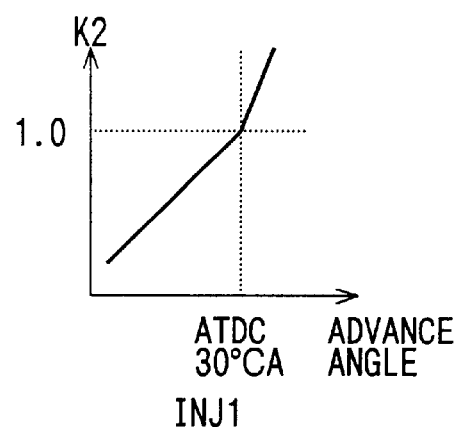
FIG. 27 is a graph showing a relation used by the third embodiment to determine a correction coefficient K2 for an opening timing of an intake valve.

As described above, the correction coefficient K2 is set on the basis of the actual opening timing VT of the intake valve 211. However, the correction coefficient K2 can also be set in accordance with a fuel injection timing INJ1 as shown in FIG. 27. FIG. 27 is a diagram showing a map used for setting the correction coefficient K2. For a fuel injection timing coinciding with the ATDC of 30 degrees CA, the correction coefficient K2 is set at 1 since no correction is required. The greater the retard angle at which fuel injection timing INJ1 is set, the smaller the value at which the correction coefficient K2 is set so that the fuel injection period TAU1 is shortened. For a fuel injection timing set at an angle advance ahead of the ATDC of 30 degrees CA, on the other hand, the correction coefficient K2 is set at a value greater than 1 to prolong the fuel injection period TAU1. Since the fuel injection timing INJ1 is set in accordance with the opening timing of the intake valve 211, the correction coefficient K2 of the fuel injection period TAU1 can also be set on the basis of the fuel injection timing.

After the correction coefficient K2 is set as described above, the processing proceeds to step 2403 (FIG. 25) at which the transient correction coefficient FAEW is computed as follows:

$$FAEW = K1 \times K2 \quad (3)$$

Figure 28:
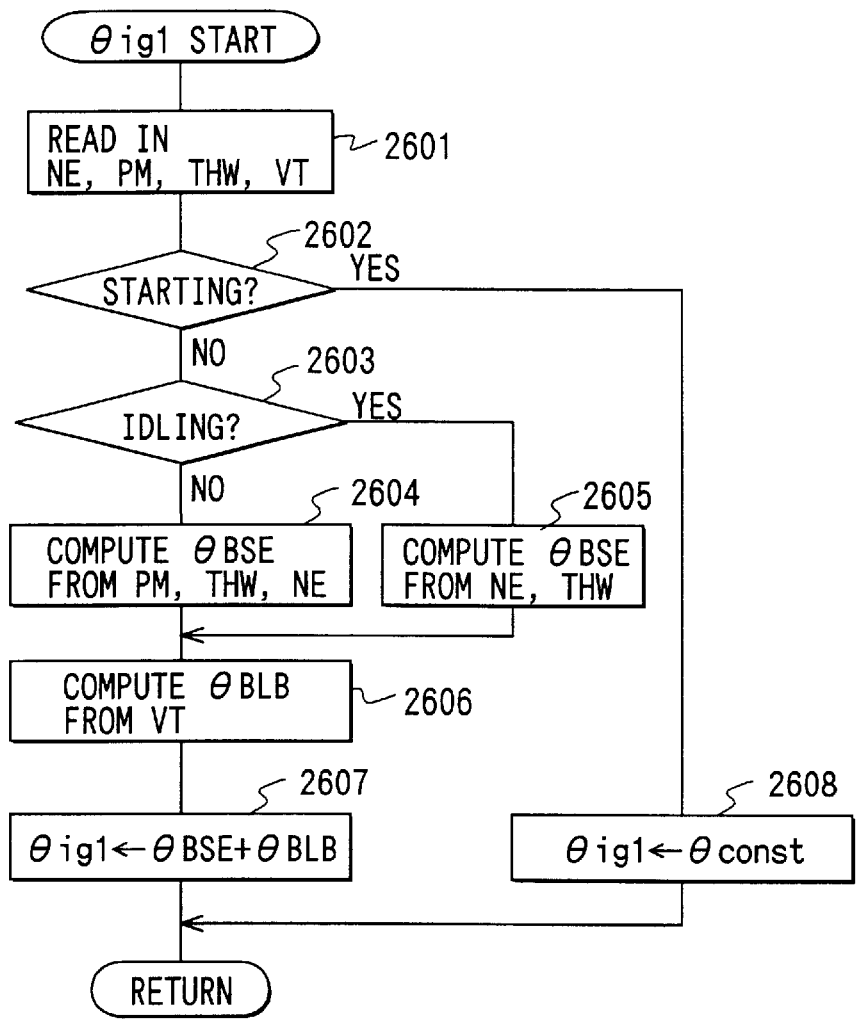
FIG. 28 is a flow diagram showing processing carried out by the third embodiment to determine an ignition timing θ ig.

FIG. 28 is a flow diagram showing details of processing carried out at step 2104 of the flow diagram shown in Fig.22 to compute the ignition timing θ ig1. This processing starts with step 2601 at which the engine speed NE, the intake passage pressure PM, the water temperature THW and the actual opening timing VT of the intake valve 211 are read in. The engine speed NE, the intake passage pressure PM, the water temperature THW and the actual opening timing of the intake valve 211 are read in at step 2601 because, at a later step, the engine rotational speed NE, the intake passage pressure PM and the water temperature THW will be used as parameters for determining the basic ignition timing whereas the actual opening timing of the intake valve 211 will be used as a parameter for computing a correction value of the basic ignition timing.

The processing then proceeds to step 2602 to determine whether the engine speed NE is at least 400 rpm, that is, whether the internal combustion engine 201 is in a start-time state. At step 2602, the routine determines whether the internal combustion engine 201 is in the start-time state. Because, in the start-time state, it is not necessary to set the ignition timing at a retard angle in order to stabilize combustion. In the after-start-time state, on the other hand, it is necessary to determine the ignition timing for retard-time control of the intake valve 211. Thus, if the determination result at step 2602 is YES, the processing proceeds to step 2608. At step 2608, a fixed ignition timing θ const is set.

Figure 29:
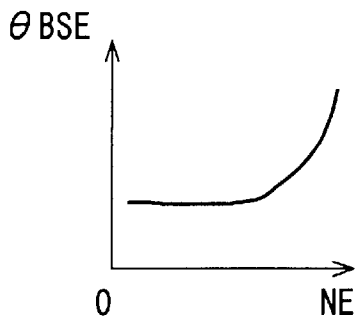
FIG. 29 is a flow diagram showing processing carried out by the third embodiment to determine a basic ignition timing θ BSE.

If the determination result at step 2602 is NO, on the other hand, the processing proceeds to step 2603. At step 2603, a signal output by a throttle position sensor is read in order to determine whether the throttle valve is fully closed, that is, whether the internal combustion engine 201 is in an idle operating state. If the determination result at step 2603 is YES, the processing proceeds to step 2605. At step 2605, the basic ignition timing θ BSE is determined from a characteristic representing a relation between the engine speed NE and the basic ignition timing θ BSE as shown in FIG. 29.

Figure 30:
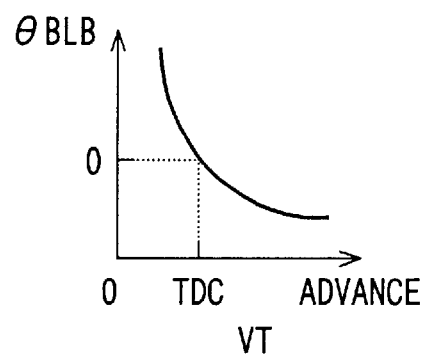
FIG. 30 is a graph showing a relation used by the third embodiment to determine a correction coefficient θ BLB for correcting an ignition timing θ ig for an opening timing of the intake valve.

The processing then proceeds to step 2606. If the determination result at step 2603 is NO, on the other hand, the processing proceeds to step 2604. At step 2604, a basic ignition timing θ BSE is determined from a data map, which is stored in the ROM 230b and based on the engine speed NE and the intake passage pressure PM. The processing then proceeds to step 2606. At step 2606, a correction value θ BLB is determined from a characteristic representing a relation between the water temperature THW and the actual opening timing VT of the intake valve 211 as shown in FIG. 30. The processing then proceeds to step 2607. Based on the characteristic representing a relation between the engine-water temperature THW and the actual opening timing of the intake valve 211 as shown in FIG. 30, the correction value θ BLB decreases when the water temperature THW increases.

At step 2607, the correction value θ BLB for the actual opening timing of the intake valve 211 is added to the basic ignition timing θ BSE, and a sum obtained as a result of the addition is used as a new ignition timing θ ig1. Then, the execution of this timing ends.

In this embodiment, the flow velocity of the intake air can be raised by setting the opening timing of the intake valve 211 at a retard angle. Thus, the amount of fuel stuck on the inner wall of the intake passage can be reduced. By reducing the amount of fuel stuck on the inner wall of the intake passage, the warming-up fuel increase quantity can also be decreased. Thus, it is possible to execute air-fuel ratio control with a high degree of precision. As a result, the precision of the after-start control can be improved.

Figure 31:
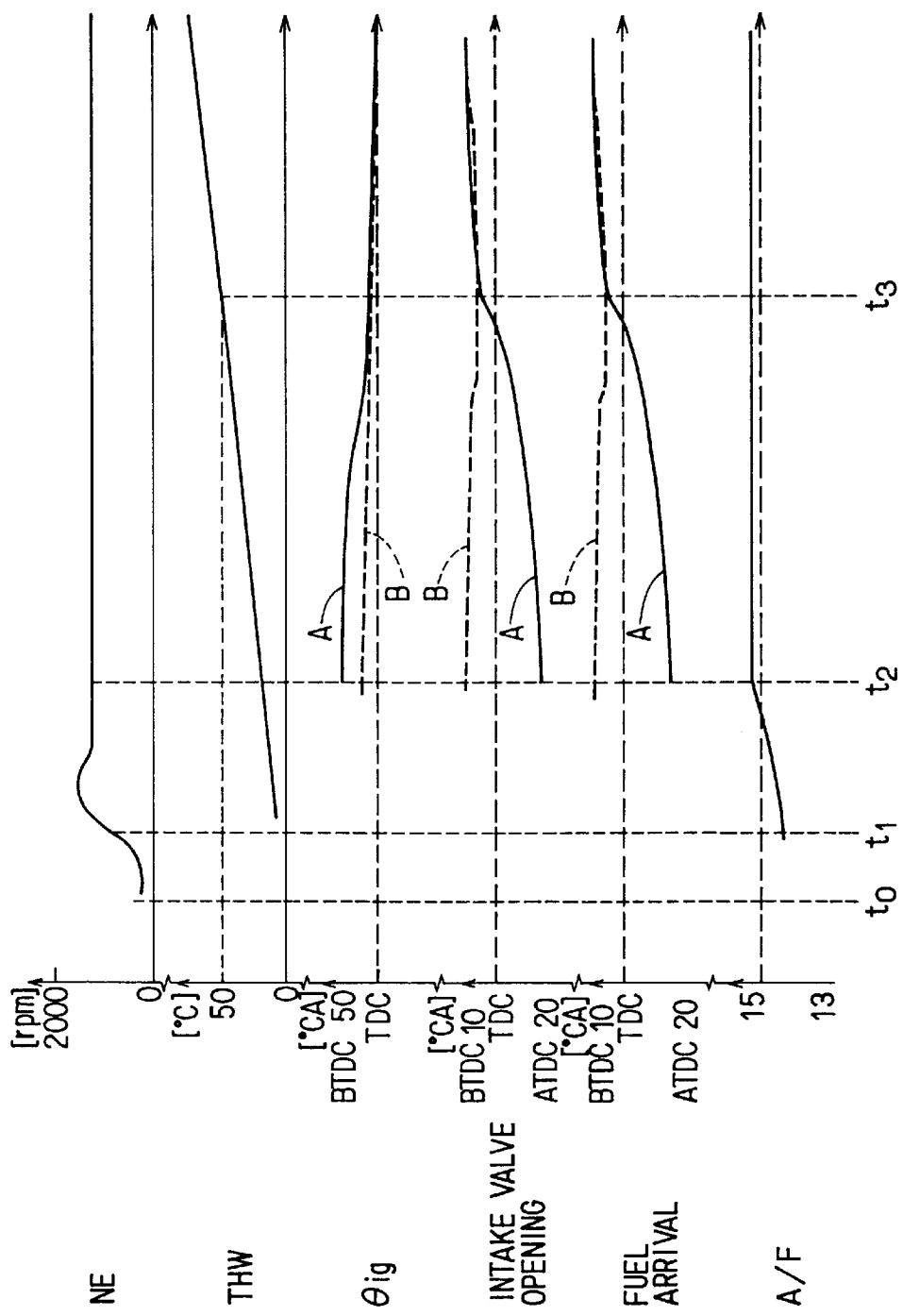
FIG. 31 is a timing diagram showing operation of the third embodiment.

Timing diagrams representing the operation of the third embodiment are explained by referring to FIG. 31. After the ignition switch is turned on at time t0, the internal combustion engine 201 enters a cranking state. Thereafter, at time t1, a first explosion occurs and the engine speed NE is examined to determine whether the engine speed NE has reached about 400 rpm, that is, whether, the internal combustion engine 201 has entered a start state. Thereafter, the engine speed NE is set at a predetermined idle speed.

When the internal combustion engine 201 is started as such, the water temperature THW of the engine increases. In this embodiment, the temperature of the engine increases water increases from 0 degrees Celsius, reaching 50 degrees Celsius at time t3 shown.

The valve-adjusting mechanism for setting the opening timing of the intake valve 211 at any arbitrary value is driven by oil pressure. Thus, the opening timing of the intake valve 211 cannot be changed till the oil pressure increases to a predetermined value. For this reason, the retard angle control of the intake valve 211 is not started before a period of about 4 to 5 seconds has lapsed after the start of the internal combustion engine 201 or before the oil pressure reaches a level capable of driving the valve adjusting mechanism at time t2. In the conventional start control, the intake valve 211 is set to open on the advance angle side as indicated by a dashed line B. In this embodiment, on the other hand, the intake valve 211 is opened at a retard angle as indicated by a solid line A to generate a difference in pressure between the intake passage and the pressure chamber so that the flow velocity of the intake air increases.

At that time, by setting a timing with which injected fuel arrives in the combustion chamber at a timing with which the intake valve 211 is opened, the fuel enters the combustion chamber at an increased flow velocity of the intake-air. Since the fuel injected into the combustion chamber is well agitated in the chamber, stable combustion can be carried out.

It should be noted that, in this embodiment, the fuel injection period TAU1 is corrected to a smaller value at that time. Thus, the amount of fuel stuck on the inner wall of the intake passage can be decreased and air-fuel ratio control can be executed with a high degree of precision. In addition, the magnitude of the torque can be increased due to the advance angle at which the ignition timing is set in comparison with the conventional ignition timing indicated with the characteristics B.

As described above, the opening timing of the intake valve 211 is set at the retard angle during the engine temperature range 0 degrees Celsius to 50 degrees Celsius, and control of the fuel injection timing as well as control of the ignition timing are executed in accordance with the opening timing. In addition, since the fuel injection period TAU1 is corrected to a smaller value at that time, stable control of the air-fuel ratio can be executed.

In the third embodiment, the basic fuel injection volume is set at such a value that the air-fuel ratio approaches the stoichiometric ratio. While the known conventional fuel-volume-increasing correction is carried out in order to stabilize combustion, the intake valve is subjected to retard angle control to increase the flow velocity of the intake-air. For this reason, since the amount of fuel stuck on the inner wall of the intake passage can be reduced, control of the air-fuel ratio can be executed with a high degree of precision. In addition, since fuel enters the combustion chamber at a high flow velocity of the intake-air, the fuel is well agitated in the chamber. Thus, the amount of unevenness of fuel distribution can be reduced to result unstable combustion. As a result, it is possible to prevent lowering of drivability due to a missing spark.

In addition, this embodiment can also be applied to control executed on the lean side of the air-fuel ratio. In this case, the basic fuel injection volume is set on the basis of the intake passage pressure PM and an engine speed NE to result in a lean air-fuel ratio, and the fuel volume is corrected to a greater value in accordance with the temperature of the water as is done in accordance with a known conventional method. At that time, since the flow velocity of the intake-air can be increased by setting the intake valve at a retard angle, the amount of fuel stuck on the inner wall of the intake passage can be reduced. By reducing the amount of fuel stuck on the inner wall of the intake passage, the number of causes of the air-fuel ratio deterioration can be decreased. An example of such causes is departure of some of fuel stuck on the inner wall of the intake passage. Thus, control of the air-fuel ratio can be executed with a high degree of precision.

In the case of lean combustion, the fuel injection volume is small in comparison with the stoichiometric control. Accordingly, the air-fuel ratio can be prevented from becoming unstable due to fuel stuck on the inner wall of the intake passage. In particular, in the case of lean combustion, the torque varies with ease. By execution of control according to the embodiment, however, lean combustion can be carried out after a start of the internal combustion engine 201 with a high degree of precision. As a result, it is possible to prevent the lowering of the drivability due to a missing spark.

In the third embodiment, the function of a fuel-injection-volume control means is executed at steps 2104 and 2107 of the flow diagram shown in FIG. 22 whereas the function of a valve adjusting means is executed at steps 2105 and 2108 of the flow diagram shown in FIG. 22. The function of a stuck-fuel-reducing means is executed at step 2502 of the flow diagram shown in FIG. 26 and the function of a retard angle control means is executed at step 2105 of the flow diagram shown in FIG. 22. The function of a fuel injection timing control means is executed in the processing represented by the flow diagram shown in FIG. 23 and the water temperature detecting means is implemented by the water temperature sensor 217.

Fourth Embodiment

In the third embodiment, the degree of warming-up fuel increase correction is reduced and, in order to improve the precision of the fuel injection control, the opening timing of the intake valve 211 is set at the retard angle while the ignition timing is set at the advance angle so as to allow the control of the air-fuel ratio to be stabilized. The control of the air-fuel ratio can be executed with a high degree of precision because, by setting the opening timing of the intake valve 211 at the retard angle, the flow velocity of the intake air can be raised so that the amount of to fuel stuck on the inner wall of the intake passage can be reduced.

In the fourth embodiment, on the other hand, the opening and closing timings of the exhaust valve are each set at a variable value so that exhaust gas discharged to the exhaust passage can again flow to the combustion chamber. The operation of recirculating exhaust gas within the combustion chamber is referred to hereafter as internal EGR (exhaust gas recirculation). By executing this control in the retard angle control of the intake valve 211 in the third embodiment, exhaust gas can be left in the combustion chamber and unburned components of the exhaust gas can be reused in combustion. Thus, the amount of emission can be reduced.

Figure 32:
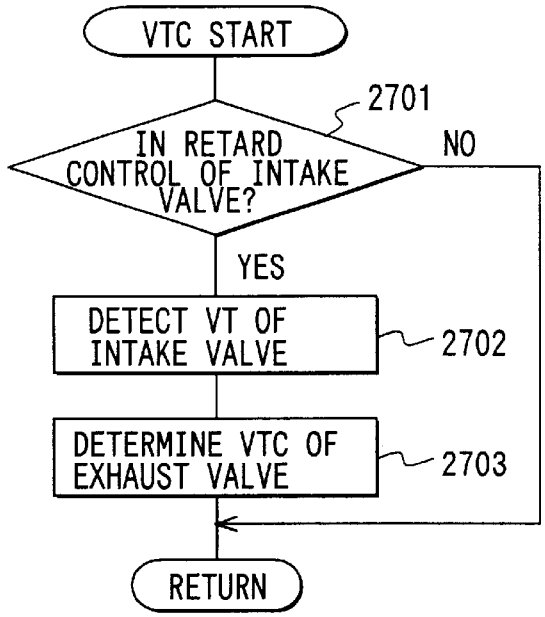
FIG. 32 is a flow diagram showing processing carried out by the fourth embodiment to set the closing timing of the exhaust valve for an opening timing of the intake valve.

FIG. 32 is a flow diagram showing processing to set a target closing timing VTC of the exhaust valve 212. The flow diagram starts with step 2701 to determine whether retard angle control of the intake valve 211 is being implemented. If the result of the determination indicates that retard angle control of the intake valve 211 is not being implemented, the execution of this routine ends. If the result of the determination indicates that retard angle control of the intake valve 211 is being implemented, on the other hand, the processing proceeds to step 2702 at which an actual opening timing of the intake valve 211 is detected. Then, at the next step 2703, a target closing timing VTC of the exhaust valve 212 is determined in accordance with the actual opening timing VT of the intake valve 211.

Figure 33:
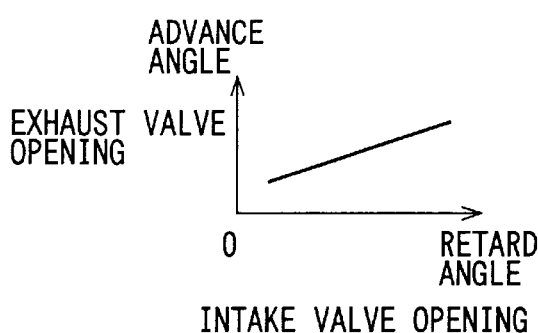
FIG. 33 is a graph showing a relation used by the fourth embodiment to set the closing timing of the exhaust valve for of an opening timing of the intake valve.

As shown in FIG. 33, if the magnitude of the retard angle of the intake valve 211 is small, the target closing timing of the exhaust valve 212 is set at a small value. If the magnitude of the retard angle of the intake valve 211 is large, on the other hand, the target closing timing of the exhaust valve 212 is set at a large value. In addition, the larger the advance angle at which the target closing timing of the exhaust valve 212 is set, the larger the amount of gas recirculation by the internal EGR. It is thus likely that the state of combustion unavoidably worsen due to a large advance angle. In order to solve this problem, a predetermined guard may be provided to restrict the advance angle of the exhaust valve 212 from increasing excessively.

By controlling the exhaust valve 212 in the third embodiment in this way, stable combustion can thus be assured even if the amount of gas recirculation by the internal EGR increases so that the amount of emission can be reduced.

Figure 34:
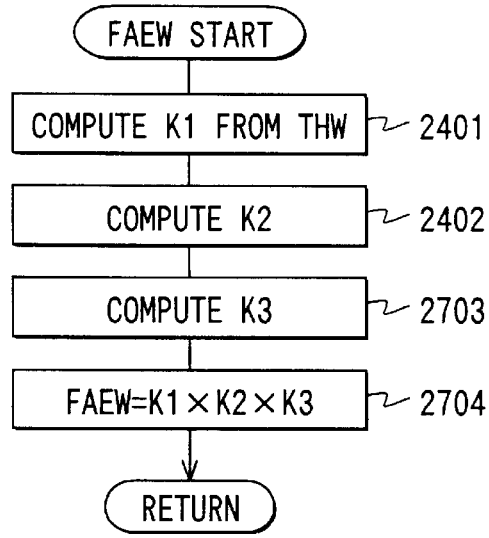
FIG. 34 is a flow diagram showing processing carried out by the fourth embodiment to determine a correction coefficient FAEW.

FIG. 34 is a flow diagram showing processing to compute a correction coefficient FAEW based on the closing timing of the exhaust valve 212 as processing additional to the processing of the third embodiment. The correction coefficient FAEW is a coefficient for correcting the fuel injection period TAU.

Figure 35:
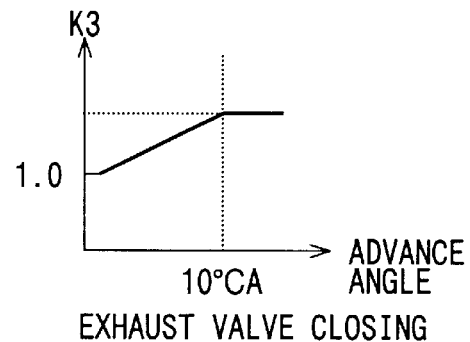
FIG. 35 is a graph showing a relation used by a fourth embodiment of the present invention to determine a correction coefficient K3 for a closing timing of an exhaust valve.

First of all, coefficients K1 and K2 are determined at respectively steps S2401 and S2402 in the same way as the third embodiment. Then, the processing proceeds to step 2703 at which a correction coefficient K3 dependent on the closing timing of the exhaust valve 212 is determined from a characteristic shown in FIG. 35. As shown in the figure, the smaller the magnitude of the advance angle of the exhaust valve 212, the smaller the value at which the correction coefficient K3 is set. The larger the magnitude of the advance angle of the exhaust valve 212, the greater the value at which the correction coefficient K3 is set. It should be noted, however, that as the advance angle of the exhaust valve 212 exceeds a predetermined magnitude, the value at which the correction coefficient K3 is set is fixed as shown in FIG. 35. The value at which the correction coefficient K3 is set is fixed because, at a large advance angle of the exhaust valve 212, the amount of gas recirculation by the internal EGR increases. Thus, by setting the correction coefficient K3 at a fixed value, it is possible to prevent combustion from deteriorating.

As a result, by setting the exhaust valve 212 at the advance angle in the fourth embodiment, the amount of emission can be reduced without deteriorating combustion.

Fifth Embodiment

In the fifth embodiment, the closing timing of the exhaust valve 212 is controlled so that the intake valve 211 opens at the crankshaft angle (for instance, 20 degrees CA) after the exhaust valve 212 has been closed, while the opening timing of the intake valve 211 is being retarded. By setting the closing timing of the exhaust valve 212 about 20 degrees CA in advance of the opening timing of the intake valve 211, the exhaust valve 211 can gas-tightly close the cylinder and the negative pressure can be generated in the cylinder by retarding the opening timing of the intake valve 211.

Figure 37:
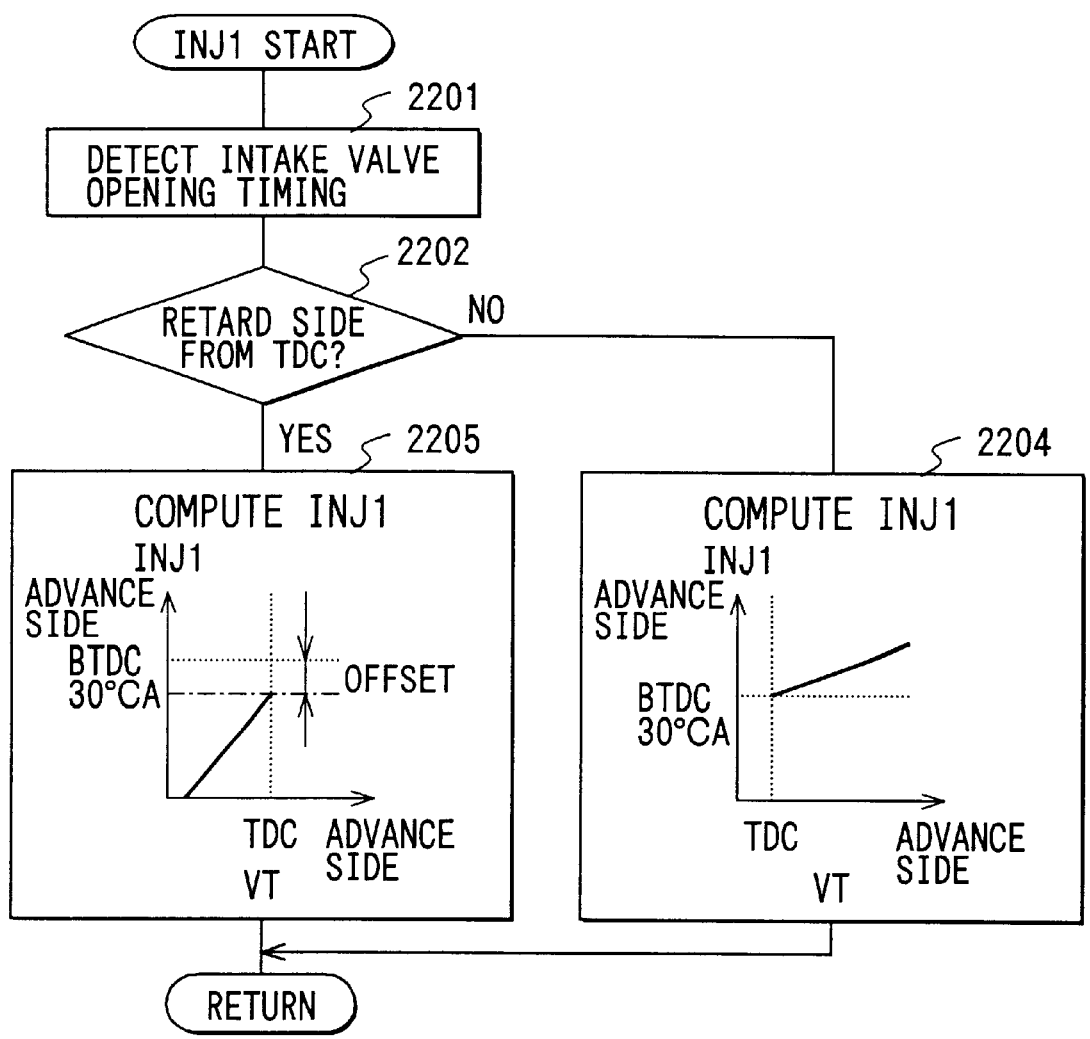
FIG. 37 is a flow diagram showing processing carried out by the fifth embodiment to determine a fuel injection timing.

In this embodiment, the valve timing control is executed in the similar manner as in the second embodiment shown in FIGS. 12 to 19, and the fuel injection control is executed in the similar manner as in the third embodiment shown in FIGS. 24 to 27 so that the fuel injection amount is controlled in correspondence with the opening timing of the intake valve 211, that is, in correspondence with the flow velocity of the intake-air. However, the fuel injection timing is controlled as shown in FIG. 37. In this fuel injection timing control, step 2205 is different from step 2203 of the third embodiment shown in FIG. 23.

That is, at step 2205, the fuel injection timing INJ1 is set based on the data map. This timing INJ1 is set so that fuel arrives in the combustion chamber after a predetermined delay from the opening timing of the intake valve 211, as opposed to the third embodiment in which the fuel injection timing INJ1 is set so that the fuel arrives at the same time as the opening timing of the intake valve 211. For this reason, as shown in the data map of step 2205, the injection timing INJ1 is offset toward the retard side.

Immediately after the intake valve 211 starts to open, the lift of the intake valve 211 is small and hence the area of the opening of the intake valve 211 between the intake passage and the combustion chamber. As a result, it is likely that less fuel is supplied into the combustion chamber even if fuel is injected. However, because the fuel injection timing is delayed by the predetermined offset to supply the injected fuel sufficiently into the combustion chamber through a large area of opening of the intake valve 211.

Figure 38:
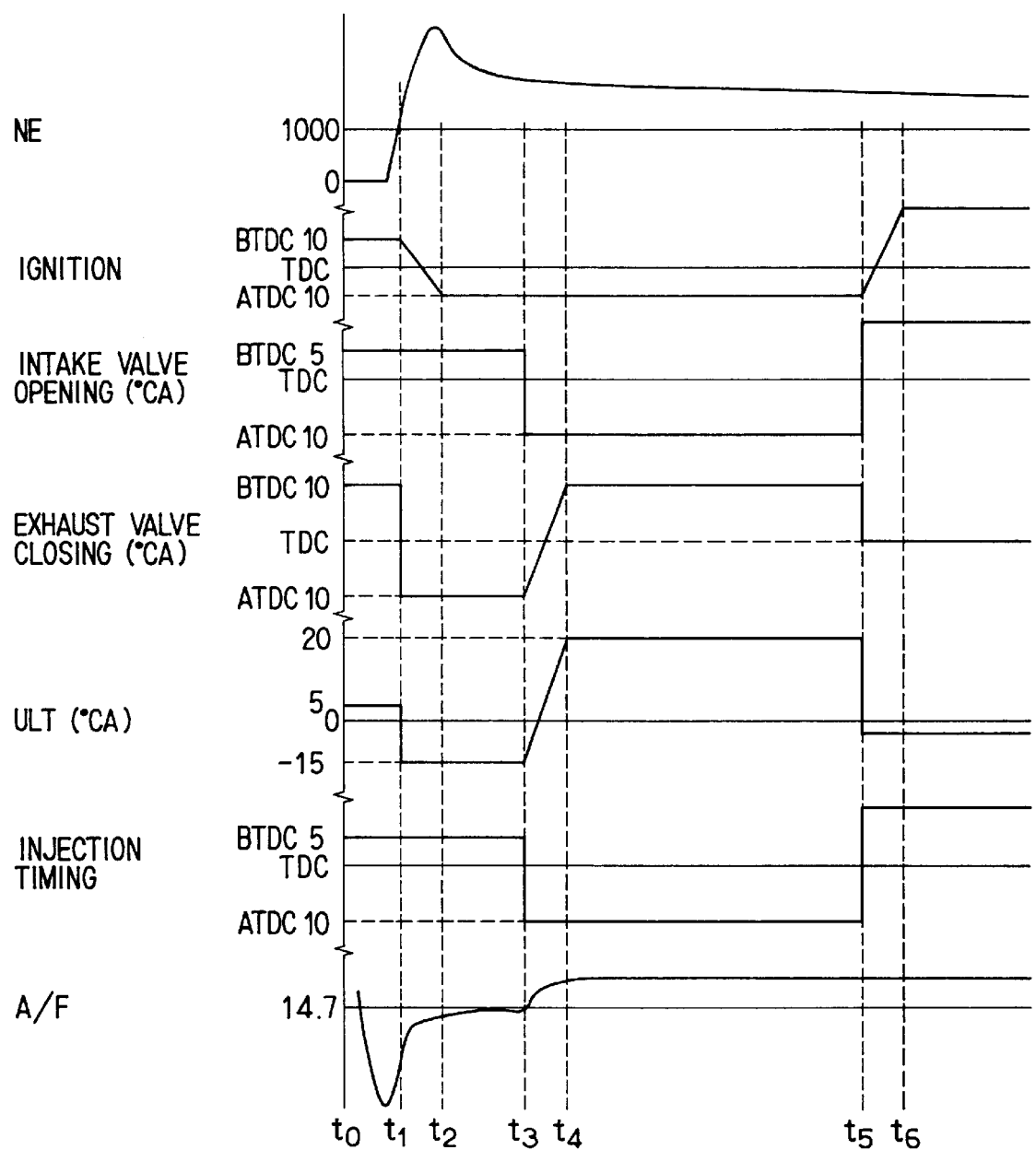
FIG. 38 is a timing diagram showing control operations of the fifth embodiment.

According to this embodiment, as shown in FIG. 38, the exhaust gas temperature in the exhaust passage rises to about 800 degrees Celsius at timing t3 and the after-burning condition is satisfied. At this timing, the air-fuel ratio is controlled to a lean side by shortening the fuel injection time TAU (decreasing fuel volume) and the opening timing of the intake valve 211 is retarded. Here, the fuel injection time TAU is determined in correspondence with the opening timing of the intake valve 211. Specifically, the fuel injection time TAU is corrected to a smaller value based on the retard angle, when the opening timing of the intake valve 211 is retarded to increase the intake-air flow velocity.

As long as the exhaust gas temperature is about 800 degrees Celsius, the unburned HC gas reacts with oxygen. For this reason, the air-fuel ratio is controlled to the lean side to provide oxygen in the exhaust passage. The lean air-fuel mixture tends to cause unstable combustion. Therefore, from timing t3 to timing t4, the opening timing of the intake valve 211 is retarded from the intake TDC. As the piston moves down from TDC in the intake stroke, the combustion chamber pressure becomes negative, and a large pressure difference is provided between the intake passage and the combustion chamber. As a result, the flow velocity of the intake air increases. Since fuel is injected at a point where the flow velocity is large, the atomization of injected fuel is improved to stabilize the lean air-fuel mixture combustion.

In this instance, the closing timing of the exhaust valve 212 is determined based on the opening timing of the intake valve 211 and the target underlap ULT. With the opening timing of the intake valve 211 being retarded from the intake TDC, the combustion chamber pressure is largely decreased. However, gas tightness of the combustion chamber is not ensured if the closing timing of the exhaust valve 212 is close to the opening timing of the intake valve 211. For this reason, the target underlap ULT is set to 20 degrees CA and the closing timing of the exhaust valve 212 is set based on this underlap ULT. As a result, the gas-tightness of the combustion chamber is ensured to increase the flow velocity of the intake air for the stable combustion.

Other Embodiments

In the fifth embodiment, it is possible to detect a semi-warmed state to retard the opening timing of the intake valve 211 from the intake TDC under the semi-warmed state when the engine is started.

In the case of the third, fourth and fifth embodiments, the exhaust valve 212 is set at the retard angle to raise the flow velocity of the intake air. Another embodiment has a mechanism for setting the valve lift quantity at a variable value. Specifically, a valve-lift control means executes control to raise the flow velocity of the intake air, exhibiting the same effects as the second and fourth embodiments.

Figure 36:
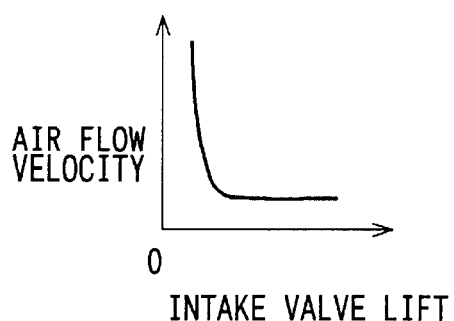
FIG. 36 is a graph showing a relation between a valve lift quantity and the flow velocity of intake air in another embodiment.

In the case of the third embodiment, the lift quantity of the intake valve 211 is reduced as shown in FIG. 36 instead of setting a target opening timing of the intake valve 211. A small valve lift quantity increases the flow velocity of the intake air due to a decreased area of the intake cross section. At a large valve lift quantity, on the other hand, intake air flows at a normal flow velocity. Since the flow velocity of the intake air can be increased by reducing the valve lift quantity as described above, the amount of fuel stuck on the inner wall of the intake passage can be reduced. As a result, stable control of the air-fuel ratio can be executed.

It should be noted that, with the valve lift quantity reduced, the area of the intake cross section also decreases as well. It is thus feared that the amount of intake air flowing into the combustion chamber is not sufficient. At that time, since the opening of the throttle valve is increased by a throttle valve control means, however, control can be executed with a high degree of precision without causing an insufficient amount of intake air flowing into the combustion chamber. It should be noted that, in an internal combustion engine having an idle speed control mechanism, a control valve of the mechanism may be adjusted to assure a sufficient amount of intake air flowing into the combustion chamber.

The present invention should not be limited to the disclosed embodiments, but may be modified in various other ways without departing from the spirit of the invention.

What is claimed is:

1. A control apparatus for an internal combustion engine, which executes retard angle control of an ignition timing in order to warm up a catalyst at an early time, the control apparatus comprising:

a fuel injection valve for injecting fuel;

a fuel injection volume control means for controlling a fuel injection volume of fuel injected by the fuel injection valve;

an intake valve for opening and closing an intake passage of the internal combustion engine;

an intake variable valve timing mechanism for variably setting an opening timing of the intake valve; and an intake variable valve timing control means for retarding the opening timing of the intake valve to control the intake valve timing mechanism, wherein the intake variable valve timing control means includes a retard angle control means for adjusting the opening timing of the intake valve set by the intake variable valve timing control means to a timing at a retard angle after a cold start of the internal combustion engine, and wherein the fuel injection volume control means includes a retard-time fuel control means for executing fuel injection volume control based on the opening timing of the intake valve adjusted by the retard angle control means.

2. The control apparatus as in claim 1, wherein the retard angle control means sets the opening timing of the intake valve at a retard angle so that a difference in pressures between air in the intake passage and gas in a combustion chamber becomes greater than a predetermined value.

3. The control apparatus as in claim 1, wherein the retard angle control means sets the opening timing of the intake valve at a retard angle so that an amount of gas, which flows back to the intake passage when the intake valve is opened, becomes greater than a predetermined value.

4. The control apparatus as in claim 1, further comprising:

a start-determining means for determining whether the internal combustion engine has started; and an intermediate holding mechanism for adjusting the opening timing of the intake valve to a predetermined value proper for a start of the internal combustion engine, wherein, with the opening timing of the intake valve adjusted by the intermediate holding mechanism to the predetermined value proper for a start of the internal combustion engine, the retard angle control means retards the opening timing of the intake valve from the predetermined value if the start-determining means determines that the internal combustion engine has started.

5. The control apparatus as in claim 4, further comprising:

a warmed-state detecting means for detecting a warmed state of the internal combustion engine, wherein the retard angle control means sets the intake valve at a retard angle at a start time of the internal combustion engine if the warmed-state detecting means detects a semi-warmed state of the internal combustion engine at the start time of the internal combustion engine.

6. The control apparatus as in claim 5, wherein the warmed-state detecting means detects the semi-warmed state of the internal combustion engine when the catalyst is not warmed and the internal combustion engine is almost warmed.

7. The control apparatus as in claim 6, wherein the warmed-state detecting means detects the semi-warmed state of the internal combustion engine based on at least one of an engine water temperature of the internal combustion engine, a lapse of time after a start of the internal combustion engine, an intake air temperature and an integrated value of an engine speed.

8. The control apparatus as in claim 1, wherein the retard-time fuel control means corrects a fuel injection volume by reducing the fuel injection volume when the retard angle control means sets the opening timing of the intake valve at a retard angle.

9. The control apparatus as in claim 1, further comprising:

an advance angle control means for setting the opening timing of the intake valve at an advance angle, wherein the fuel injection volume control means includes an advance-time fuel control means for correcting a fuel injection volume by increasing the fuel injection volume, when the advance angle control means sets the opening timing of the intake valve at an advance angle.

10. The control apparatus as in claim 1, further comprising:

an exhaust valve for opening and closing an exhaust passage of the internal combustion engine;

an exhaust variable valve timing mechanism for varying a closing timing of the exhaust valve; and an exhaust variable valve timing control means for setting a closing timing of the intake valve to control the exhaust variable valve timing mechanism, wherein the exhaust variable valve timing control means includes an advance angle control means for advancing the closing timing of the exhaust valve if the retard angle control means retards the opening time of the intake valve.

11. The control apparatus as in claim 1, further comprising:

an exhaust valve for opening and closing an exhaust passage of the internal combustion engine;

an exhaust variable valve timing mechanism for varying a closing timing of the exhaust valve; and an exhaust variable valve timing control means for setting a closing timing of the intake valve to control the exhaust variable valve timing mechanism, wherein the exhaust variable valve timing control means includes an intake-based control means for controlling the exhaust variable valve timing mechanism so as to set a closing timing of the exhaust valve in accordance with the opening timing of the intake valve during a period of time in which the opening timing of the intake valve is set at the retard angle by the retard angle control means.

12. The control apparatus as in claim 11, wherein the intake-based control means controls the exhaust variable valve timing mechanism so as to set the closing timing of the exhaust valve after a period of time corresponding to a predetermined angle of crankshaft rotation has lapsed after a closure of the exhaust valve during a period of time in which the opening timing of the intake valve is set at the retard angle by the retard angle control means.

13. A control apparatus for an internal combustion engine comprising:

a fuel injection valve for injecting fuel;

a fuel injection volume control means for controlling a fuel injection volume of fuel injected by the fuel injection valve;

an intake valve for opening and closing an intake passage of the internal combustion engine;

an intake valve adjusting mechanism capable of variably adjusting opening timing of the intake valve and/or lift quantity;

an intake valve adjusting means for controlling the valve adjusting mechanism so as to set the opening timing of the intake valve and/or lift quantity at desired values; and a stuck fuel reducing means for reducing the amount of fuel stuck on an intake system by adjusting the opening timing of the intake valve and/or lift quantity so as to increase the flow velocity of intake air and by correcting the fuel injection volume on the basis of the adjusted opening time of the intake valve and/or adjusted lift quantity.

14. The control apparatus as in claim 13, further comprising:

a retard angle control means for setting the opening timing of the intake valve at a retard angle, wherein the stuck fuel reducing means reduces the amount of fuel stuck on an intake system by correcting the fuel injection volume controlled by the fuel injection volume control means on the basis of the retard angle to which the retard angle control means sets the opening timing of the intake valve.

15. The control apparatus as in claim 14, further comprising:

a fuel injection timing control means for controlling an injection timing of fuel injected by the fuel injection valve, wherein the fuel injection timing control means sets the injection timing of the fuel injected by the fuel injection valve at a value on the basis of the retard angle to which the retard angle control means sets the opening timing of the intake valve so that the fuel arrives at an inside of a combustion chamber when the intake valve starts opening.

16. The control apparatus as in claim 14, further comprising:

an exhaust valve for opening and closing an exhaust passage of the internal combustion engine;

an exhaust valve adjusting mechanism capable of variably adjusting a closing time of the exhaust valve; and an exhaust valve adjusting means for controlling the exhaust valve adjusting mechanism so as to set the closing time of the exhaust valve at a desired value, wherein the exhaust valve adjusting means sets the closing timing of the exhaust valve at an advance angle if the retard angle control means sets the opening time of the intake valve at the retard angle.

17. The control apparatus as in claim 16, wherein the stuck-fuel-reducing means has an exhaust valve advance angle volume increasing correction means for increasing the fuel injection volume when the exhaust valve adjusting means sets the exhaust valve at the advance angle.

18. The control apparatus as in claim 17, further comprising:

a throttle valve provided on the intake passage for adjusting volume of air taken in the intake passage; and a throttle valve control means for adjusting the throttle valve in accordance with an operating state, wherein the throttle valve control means adjusts the opening of the throttle valve to increase the volume of air taken in by the intake passage when the stuck fuel reducing means carries out correction to reduce the amount of fuel stuck on the intake system and correction to reduce the fuel injection volume.

19. The control apparatus as in claim 16, further comprising:

an exhaust valve for opening and closing an exhaust passage of the internal combustion engine;

an exhaust variable valve timing mechanism for varying a closing timing of the exhaust valve; and an exhaust variable valve timing control means for setting a closing timing of the intake valve to control the exhaust variable valve timing mechanism, wherein the exhaust variable valve timing control means includes an intake-based control means for controlling the exhaust variable valve timing mechanism so as to set a closing timing of the exhaust valve in accordance with the opening timing of the intake valve during a period of time in which the opening timing of the intake valve is set at the retard angle by the retard angle control means.

20. The control apparatus as in claim 19, wherein the intake-based control means controls the exhaust variable valve timing mechanism so as to set the closing timing of the exhaust valve after a period of time corresponding to a predetermined angle of crankshaft rotation has lapsed after a closure of the exhaust valve during a period of time in which the opening timing of the intake valve is set at the retard angle by the retard angle control means.

21. A control apparatus for an internal combustion engine according to claim 14, wherein the retard angle control means sets the opening timing of the intake valve at an angle retard from a top dead center.

22. The control apparatus as in claim 14, further comprising:

a start-determining means for determining whether the internal combustion engine has started; and an intermediate holding mechanism for adjusting the opening timing of the intake valve to a predetermined value proper for a start of the internal combustion engine, wherein, with the opening timing of the intake valve adjusted by the intermediate holding mechanism to the predetermined value proper for a start of the internal combustion engine, the retard angle control means retards the opening timing of the intake valve from the predetermined value if the start-determining means determines that the internal combustion engine has started.

23. The control apparatus as in claim 14, further comprising:

a warmed-state detecting means for detecting a warmed state of the internal combustion engine, wherein the retard angle control means sets the intake valve at a retard angle at a start time of the internal combustion engine if the warmed-state detecting means detects a semi-warmed state of the internal combustion engine at the start time of the internal combustion engine.

24. The control apparatus as in claim 23, wherein the warmed-state detecting means detects the semi-warmed state of the internal combustion engine when the catalyst is not warmed and the internal combustion engine is almost warmed.

25. The control apparatus as in claim 24, wherein the warmed-state detecting means detects the semi-warmed state of the internal combustion engine based on at least one of an engine water temperature of the internal combustion engine, a lapse of time after a start of the internal combustion engine, an intake air temperature and an integrated value of an engine speed.

26. The control apparatus as in claim 13, further comprising:

a valve lift quantity control means for controlling a valve lift quantity of an intake valve so as to increase the flow velocity of intake air, wherein, after a cold start of the internal combustion engine, the stuck fuel reducing means reduces the amount of fuel stuck on the intake system by correcting the fuel injection volume controlled by the fuel injection volume control means due to the fact that the flow velocity of the intake air is increased as a result of control of the valve lift quantity by the valve lift quantity control means.

27. The control apparatus as in claim 27, further comprising:

an exhaust valve for opening and closing an exhaust passage of the internal combustion engine;

an exhaust valve adjusting mechanism capable of variably adjusting a closing time of the exhaust valve; and an exhaust valve adjusting means for controlling the exhaust valve adjusting mechanism so as to set the closing time of the exhaust valve at a desired value, wherein the exhaust valve adjusting means sets the closing time of the exhaust valve at an advance angle due to the fact that the flow velocity of the intake air is increased as a result of controlling of the valve lift quantity by the valve lift quantity control means.

28. The control apparatus as in claim 26, further comprising:

a fuel injection timing control means for controlling an injection timing of fuel injected by the fuel injection valve, wherein the fuel injection timing control means sets the injection timing of the fuel injected by the fuel injection valve on the basis of the retard angle to which the retard angle control means sets the opening timing of the intake valve.

29. The control apparatus as in claim 13, further comprising:

an ignition plug for generating an ignition spark in a combustion chamber of the internal combustion engine; and an ignition timing control means for controlling an ignition timing with which the ignition plug generates an ignition spark, wherein, if the fuel injection volume is corrected so that the stuck fuel reducing means reduces the amount of fuel stuck on the intake system, the ignition timing control means sets the ignition timing at an advance angle.

30. The control apparatus as in claim 13, further comprising:

a water temperature detecting means for detecting a temperature of water for cooling the internal combustion engine, wherein control is executed to correct the fuel injection volume so as to reduce the amount of fuel stuck on an intake system by using the stuck fuel reducing means when the water temperature detecting means detects a temperature of water for cooling the internal combustion in a temperature range of about 0 degrees Celsius to 50 degrees Celsius.

* * * * *